United States Patent
Seol et al.

(10) Patent No.: US 9,661,592 B2
(45) Date of Patent: May 23, 2017

(54) UPLINK POWER CONTROL METHOD AND APPARATUS IN A BEAM-FORMING BASED WIRELESS COMMUNICATION SYSTEM

(71) Applicant: Samsung Electronics Co., Ltd, Gyeonggi-do (KR)

(72) Inventors: Ji-Yun Seol, Gyeonggi-do (KR); TaeYoung Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 68 days.

(21) Appl. No.: 14/142,656

(22) Filed: Dec. 27, 2013

(65) Prior Publication Data

US 2014/0185481 A1 Jul. 3, 2014

(30) Foreign Application Priority Data

Dec. 27, 2012 (KR) .......................... 10-2012-0154743

(51) Int. Cl.
*H04W 52/42* (2009.01)
*H04W 52/24* (2009.01)
*H04W 52/14* (2009.01)
*H04B 7/06* (2006.01)

(52) U.S. Cl.
CPC ........... *H04W 52/42* (2013.01); *H04W 52/24* (2013.01); *H04B 7/0617* (2013.01); *H04W 52/146* (2013.01); *H04W 52/242* (2013.01); *H04W 52/245* (2013.01)

(58) Field of Classification Search
CPC ..................................................... H04L 5/0051

USPC .......................................................... 370/252
See application file for complete search history.

(56) References Cited

U.S. PATENT DOCUMENTS

| | | |
|---|---|---|
| 2006/0270434 A1 | 11/2006 | Iacono |
| 2007/0270155 A1 | 11/2007 | Nelson, Jr. et al. |
| 2009/0046573 A1* | 2/2009 | Damnjanovic ............... 370/216 |
| 2010/0120446 A1* | 5/2010 | Gaal ........................... 455/452.2 |
| 2010/0208608 A1* | 8/2010 | Wang ............................ 370/252 |
| 2011/0105059 A1 | 5/2011 | Gaal et al. |
| 2011/0255434 A1 | 10/2011 | Ylitalo |
| 2011/0319118 A1 | 12/2011 | Yu et al. |
| 2013/0100828 A1* | 4/2013 | Kishiyama ............ H04W 52/42 370/252 |

FOREIGN PATENT DOCUMENTS

| | | |
|---|---|---|
| JP | 2003-004834 | 1/2003 |
| KR | 10-2007-0059992 | 6/2007 |
| KR | 10-2012-0096408 | 8/2012 |

OTHER PUBLICATIONS

International Search Report dated Mar. 26, 2014 in connection with International Application No. PCT/KR2013/012281, 3 pages.

(Continued)

*Primary Examiner* — Wei Zhao

(57) ABSTRACT

A method for operating a Mobile Station (MS) for uplink (UL) power control in a wireless communication system. The method includes: determining an UL Transmit (Tx) power value compensated for a gain difference value between a downlink (DL) Tx beam and an UL Receive (Rx) beam of a Base Station (BS); and transmitting an UL signal based on the determined UL Tx power value.

48 Claims, 17 Drawing Sheets

(56) References Cited

OTHER PUBLICATIONS

Written Opinion of the International Searching Authority dated Mar. 26, 2014 in connection with International Application No. PCT/KR2013/012281, 6 pages.
Extended European Search Report dated Jun. 20, 2016 in connection with European Application No. 13867811.5, 10 pages.
Jiayin Zhang, et al., "Pathloss Determination of Uplink Power Control for UL CoMP in Heterogeneous Network", 2012 IEEE Globecom Workshops, Anaheim, California, Dec. 3-7, 2012, pp. 250-254.
Foreign Communication From a Related Counterpart Application, European Application No. 13867811.5-1875, Communication Pursuant to Article 94(3) EPC dated Mar. 17, 2017, 6 pages.

* cited by examiner

UPLINK POWER CONTROL METHOD AND APPARATUS IN A BEAM-FORMING BASED WIRELESS COMMUNICATION SYSTEM

PRIORITY

The present application is related to and claims priority under 35 U.S.C. §119 to an application filed in the Korean Intellectual Property Office on Dec. 27, 2012 and allocated Serial No. 10-2012-0154743, the contents of which are incorporated herein by reference.

TECHNICAL FIELD

The present disclosure relates to a wireless communication system, and in particular, to a wireless communication system operating based on beamforming.

BACKGROUND

In order to meet the increasing demands for wireless data traffic, wireless communication systems have been developed to support a higher data rate. For an increase in the data rate, the wireless communication systems have been evolved to improve the spectral efficiency based on the communication technologies such as Orthogonal Frequency Division Multiple Access (OFDMA) and Multiple Input Multiple Output (MIMO).

Recently, the increase in demands for smart phones and tablet computers and the explosive growth in the number of applications requiring a large amount of traffic have accelerated the demands for data traffic. However, the tremendous demands for wireless data traffic may not be met only with the improvement of the spectral efficiency. Therefore, there is an increasing interest for a wireless communication system using a millimeter-wave band.

A system supporting wireless communication using the millimeter-wave band may suffer from an increase in the propagation loss such as path loss and return loss due to the frequency characteristics of the millimeter-wave band. Because of the increase in the propagation loss, the arrival distance of radio waves is reduced causing a reduction in coverage. Therefore, the wireless communication system using a millimeter-wave band has been considered as being implemented by using beamforming technology. When the beamforming technology is used, it is possible to increase the arrival distance of radio waves and the coverage by mitigating the path loss of radio waves. In other words, a millimeter-wave wireless mobile communication system needs to use the beamforming technology in order to mitigate high propagation loss in the millimeter-wave band. Furthermore, the beamforming technology needs to be applied to all cases in order to reduce mismatch between data and control signals.

The beamforming technology as suggested by the Institute of Electrical and Electronics Engineers (IEEE) 802.11ad: "Very High Throughput 60 GHz" includes two phases: Sector Level Sweep (SLS) and Beam Refinement Protocol (BRP). IEEE 802.1 lad is a Wireless Local Area Network (WLAN) standard that provides a very small service area with a radius of 10 to 20 meters in the 60-GHz millimeter-wave band. To overcome a wave propagation problem encountered with the millimeter-wave band, beamforming is used.

During the SLS phase, a Station (STA) that will perform beamforming transmits the same sector frame repeatedly in different directions and a peer STA receives sector frames through quasi-omni antennas and transmits feedback regarding a direction having the highest sensitivity. Therefore, the STA may perform beamforming by acquiring information about the direction having the highest sensitivity from the peer STA. During the BRP phase, Tx and Rx beam directions between the two STAs are fine-adjusted after the SLS phase in order to increase Tx and Rx beamforming gains. Generally, after the two STAs detect the best Tx beam during the SLS phase, they search for the best Rx beam matching the best Tx beam during the BRP phase.

Compared to the millimeter-wave wireless communication system, existing 2nd Generation (2G) to 4th Generation (4G) cellular communication systems are designed to transmit and receive control channels and data in a sub-1 GHz or 1 to 3 GHz frequency band in an isotropic or omni-directional fashion. However, some resources are optionally allocated to a user satisfying a specific channel condition by digital beamforming. Research has been conducted to achieve an additional performance gain by utilizing the multipath propagation characteristics of channels with Tx/Rx diversity based on multiple transmission and reception antennas, such as Multiple Input Multiple Output (MIMO), in the existing cellular systems.

Meanwhile, the multipath propagation of channels is mitigated due to the afore-described channel characteristics and use of transmit/receive beamforming in an extremely high frequency band like a millimeter-wave band. Therefore, a beamforming gain may be achieved but it is difficult to support Tx/Rx diversity. Accordingly, previous studies were limited to determination of a beamforming weight coefficient that optimizes a performance index such as Signal to Noise Ratio (SNR) by maximizing a beamforming gain during beamforming.

A wireless communication system using the afore-described beamforming technology may optimizes a performance index such as SNR by maximizing a beamforming gain. However, the wireless communication system using the beamforming technology hardly obtains a diversity gain since characteristics of the multipath propagation are decreased. In addition, the wireless communication system using the beamforming technology may become sensitive functionally for beamforming because of a mobile station's mobility or channel state, and beam information mismatch due to delay to actual allocation after beam measurement/selection. The wireless mobile communication system using the beamforming technology becomes sensitive to channel fading and obstacles due to strong directivity resulting from application of beamforming. Therefore, the wireless mobile communication system using the beamforming technology may use one or more beam patterns having different beamwidths and beam gains differently in consideration of channel states or characteristics of available resources.

Wireless Gigabit (WiGig), which does not support MIMO, is implemented based on beamforming through an analog array of a plurality of Radio Frequency (RF)/antenna elements, basically in one RF path or RF chain. For beamforming, a transmitter sweeps beams of a specific beam pattern in a plurality of directions and a receiver selects a beam having the largest signal strength and transmits feedback about the selected beam to the transmitter. This technique is generally applicable to an indoor environment having a Line of Sight (LoS) channel path in a short range of a few meters without mobility. In an outdoor wireless mobile communication environment characterized by mobility of tens of kilometers per hour, fast terminal switching, obstacle-incurred Non-LoS (NLoS) path characteristics, or a rapidly changing channel state caused by channel fading, beamforming that forms narrow beams having directivity, maximizing a beam gain in a specific direction may only increase sensitivity due to performance degradation attributed to the user environment. Therefore, a system may be designed in which one or more beam patterns having different beamwidths and beam gains are used differently in consideration of channel states or characteristics of available resources.

However, in a case of using one or more beam patterns having different beamwidths and beam gains, a gain difference between beams occurs in a specific direction due to trade-off between a beamwidth and a beam gain according to respective beam pattern. Therefore, there is a need to consider an operation of compensating for the beam gain difference according to a difference between beam patterns in actual link adaptation or uplink power control.

SUMMARY

To address the above-discussed deficiencies, it is a primary aspect to provide an UL power control method and apparatus in a beamforming-based wireless communication system.

Another aspect of the present disclosure is to provide a method and apparatus for performing power control efficiently in consideration of beam gain differences according to use of different Tx/Rx beam patterns in a beamforming-based wireless communication system which performs transmission and reception with respect to uplink and downlink using one or more beam patterns having different beamwidths and beam gains.

According to an aspect of the present disclosure, a method for operating a Mobile Station (MS) in a wireless communication system includes: determining an uplink (UL) Transmit (Tx) power value compensated for a gain difference value between a downlink (DL) Tx beam and an UL Receive (Rx) beam of a Base Station (BS); and transmitting an UL signal based on the determined UL Tx power value.

According to another aspect of the present disclosure, a mobile station (MS) apparatus in a wireless communication system includes: a power control unit for determining an uplink (UL) Transmit (Tx) power value compensated for a gain difference value between a downlink (DL) Tx beam and an UL Receive (Rx) beam of a Base Station (BS); and a transmitting unit for transmitting an UL signal based on the determined UL Tx power value.

According to another aspect of the present disclosure, a method for operating a Base Station (BS) in a wireless communication system includes: transmitting information about a gain difference value between a downlink (DL) Transmit (Tx) beam and an uplink (UL) Receive (Rx) beam of the BS; and receiving an UL signal transmitted based on an UL Tx power value compensated for the gain difference value between the DL Tx beam and the UL Rx beam by the MS.

According to another aspect of the present disclosure, a base station (BS) apparatus in a wireless communication system includes: a transmitting unit for transmitting information about a gain difference value between a downlink (DL) Transmit (Tx) beam and an uplink (UL) Receive (Rx) beam by the BS; and a receiving unit for receiving an UL signal transmitted based on an UL Tx power value compensated for the gain difference value between the DL Tx beam and the UL Rx beam by the MS.

According to another aspect of the present disclosure, a method for operating a Mobile Station (MS) in a wireless communication system includes: determining an uplink (UL) Transmit (Tx) power value compensated for a gain difference value between a downlink (DL) Receive (Rx) beam and an UL Tx beam of the MS; and transmitting an UL signal based on the determined UL Tx power value.

According to another aspect of the present disclosure, a mobile station (MS) apparatus in a wireless communication system includes: a power control unit configured to determine an uplink (UL) Transmit (Tx) power value compensated for a gain difference value between a downlink (DL) Receive (Rx) beam and an UL Tx beam of the MS; and a transmitting unit configured to transmit an UL signal based on the determined UL Tx power value.

According to another aspect of the present disclosure, a method for operating a Base Station (BS) in a wireless communication system includes: receiving an uplink (UL) signal transmitted based on an UL Transmit (Tx) power value compensated for a gain difference value of a downlink (DL) Receive (Rx) beam and an UL Tx beam of a Mobile Station (MS).

According to another aspect of the present disclosure, a base station (BS) apparatus in a wireless communication system includes: a receiving unit configured to receive an uplink (UL) signal transmitted based on an UL Transmit (Tx) power value compensated for a gain difference value between a downlink (DL) Tx beam and an UL Receive (Rx) beam by the MS.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Figure 1:
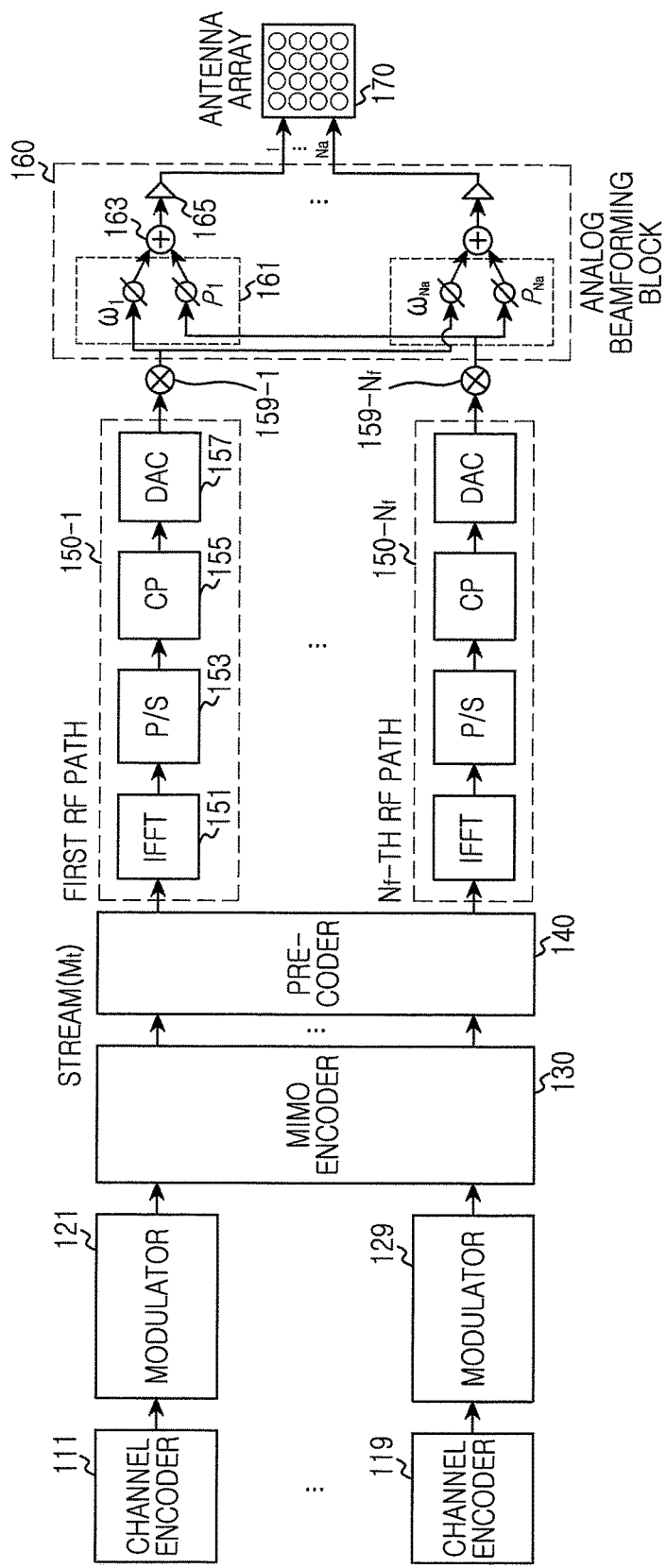
FIG. 1 illustrates a configuration of a BS transmitter supporting beamforming to which embodiments of the present disclosure are applicable.
Figure 2A:
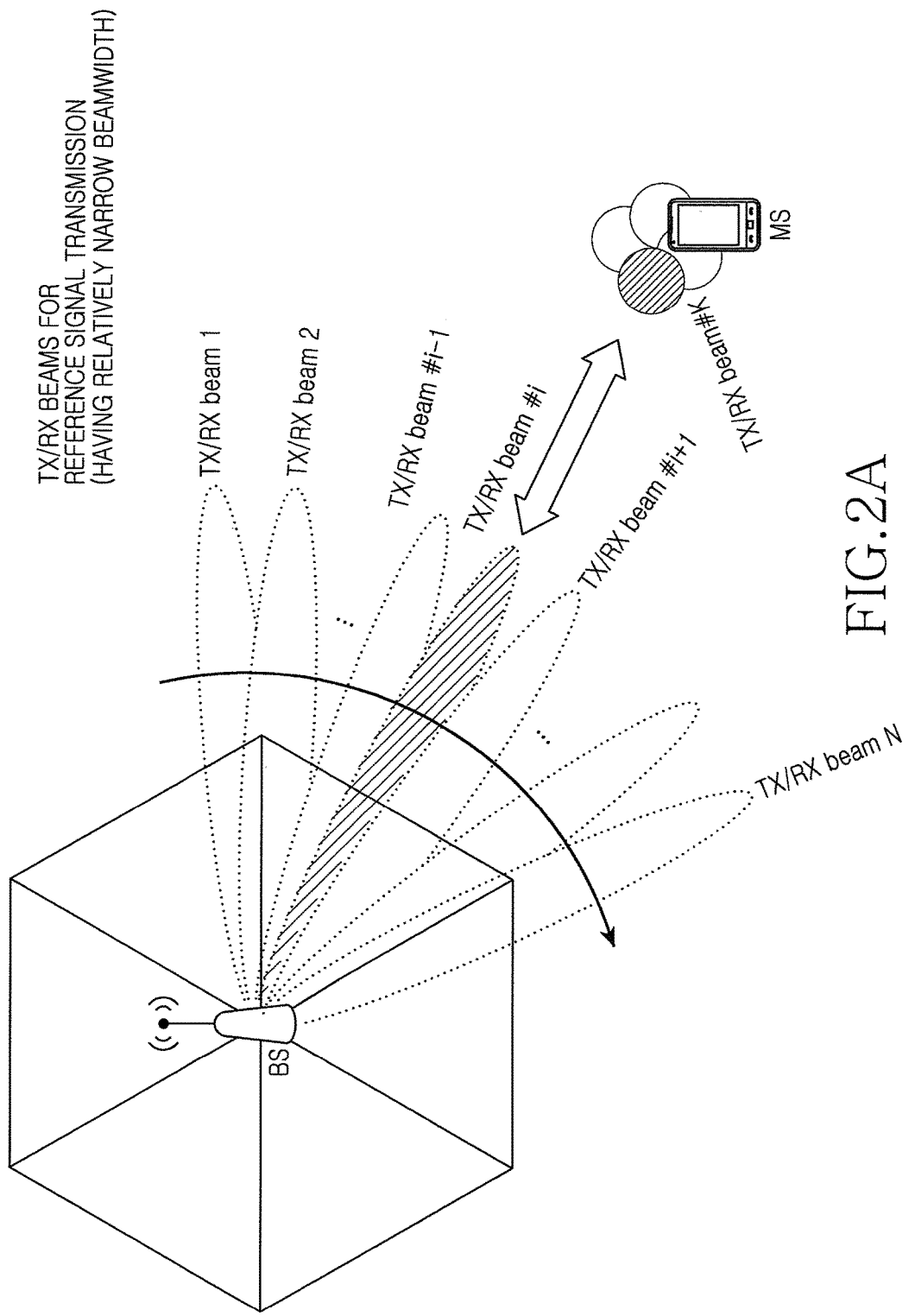
FIGS. 2A and 2B illustrates an example of a communication scenario between a BS using a plurality of Tx/Rx beams and a MS supporting a plurality of Rx/Tx beams within one BS sector.
Figure 2B:
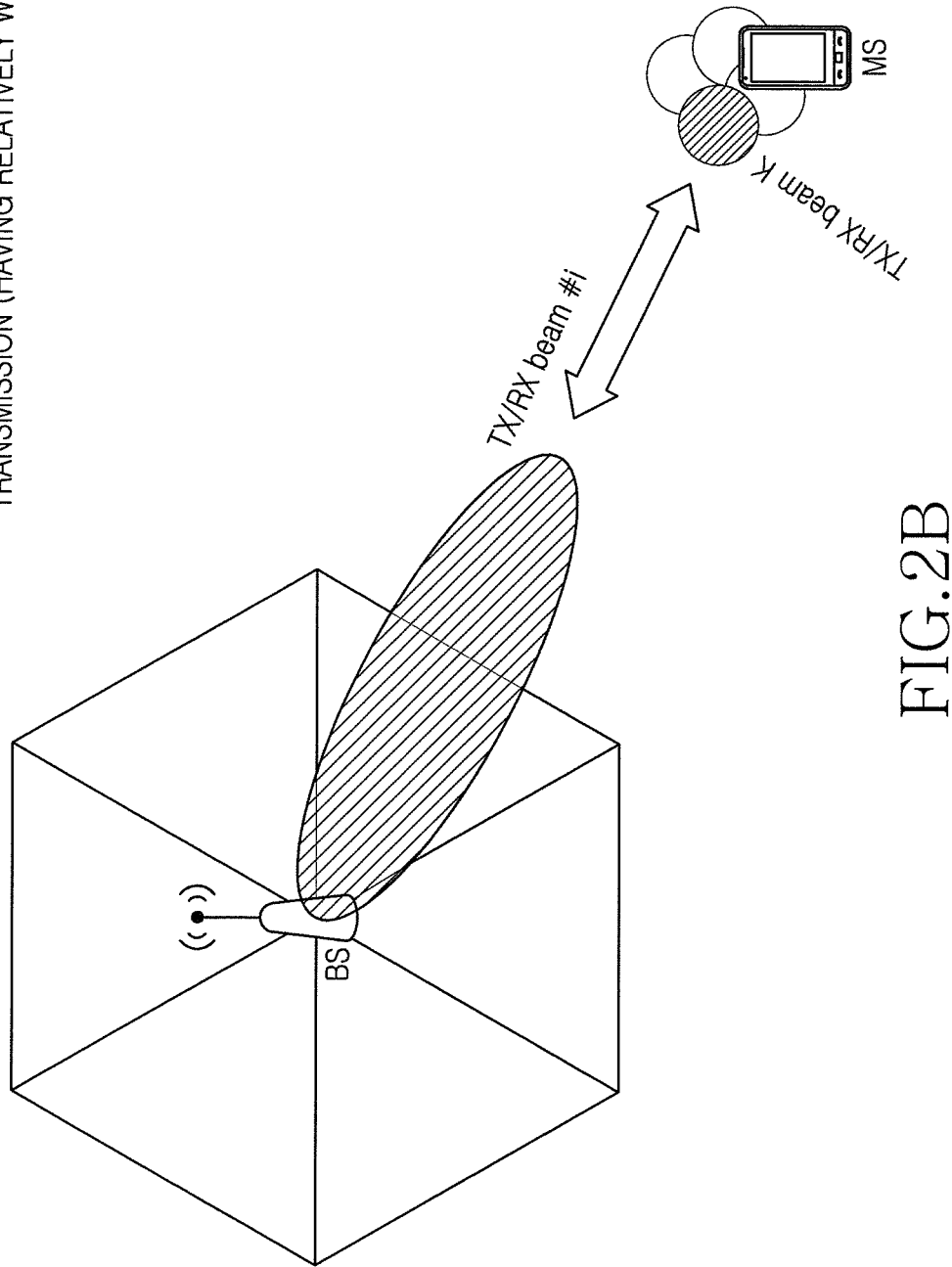
Figure 3A:
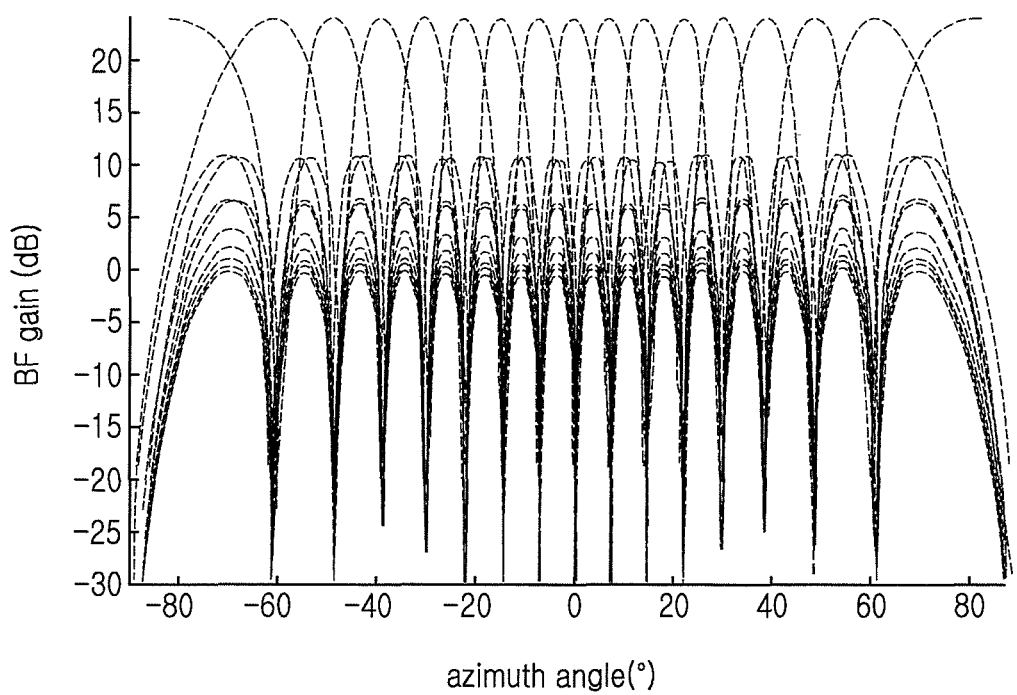
FIG. 3A illustrates an example of forming a plurality of beams having a narrow width to be used for transmission/ reception of a reference signal as illustrated in FIG. 2a in the hybrid beamforming structure as illustrated in FIG. 1.
Figure 3B:
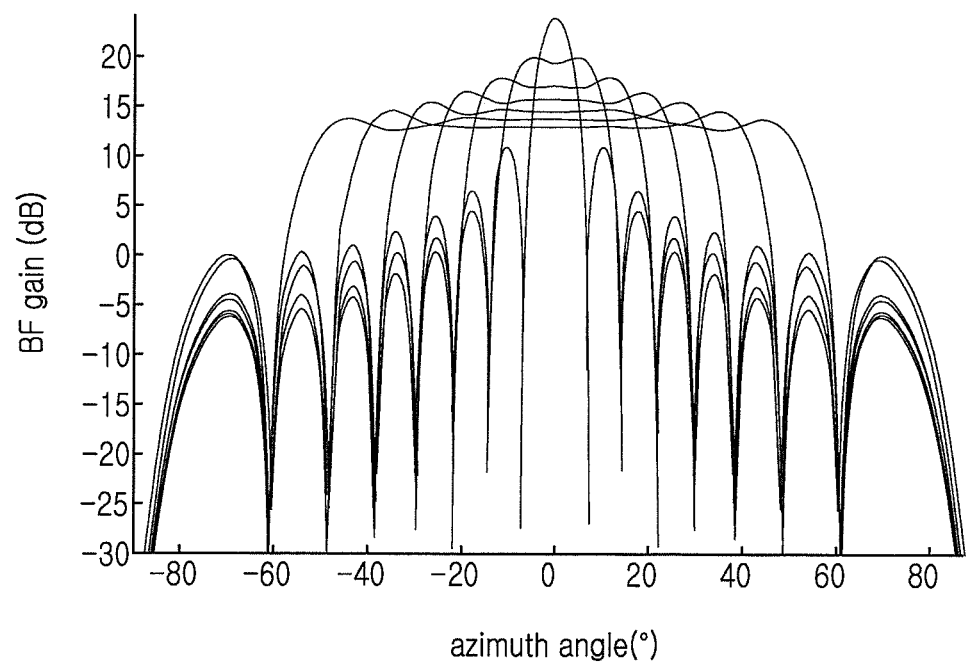
Figure 4:
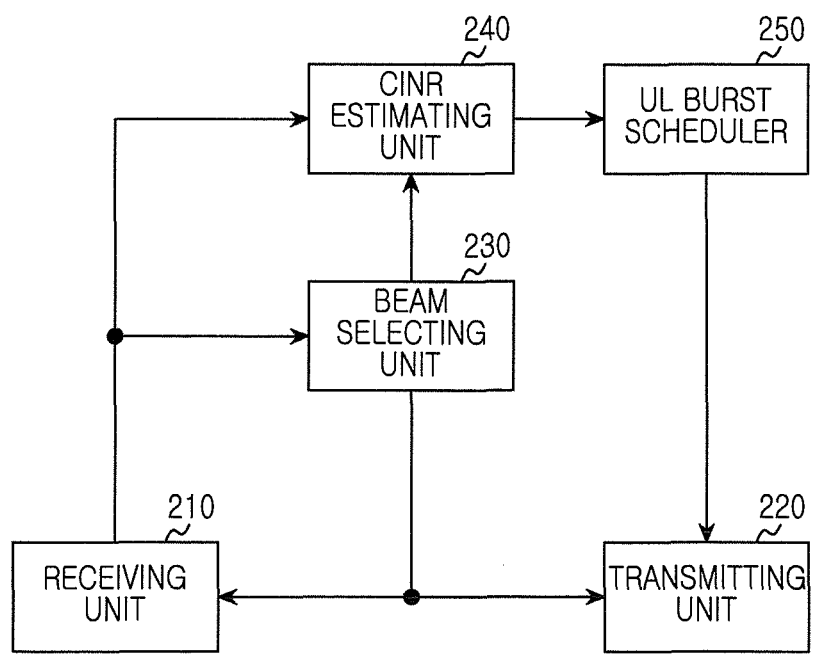
Figure 5:
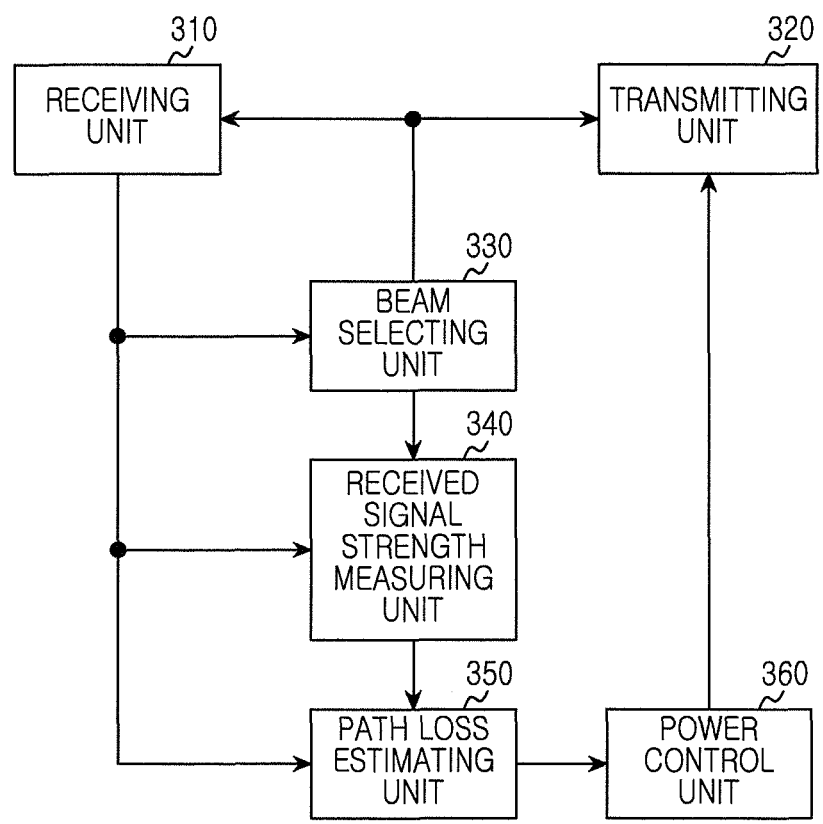
Figure 6A:
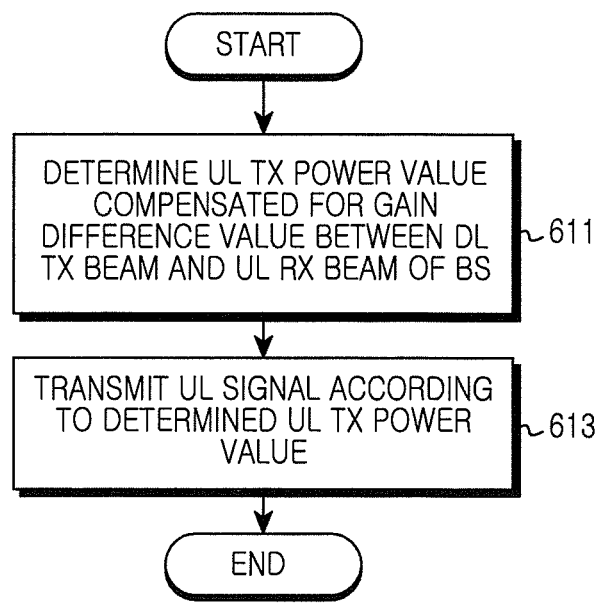
Figure 6B:
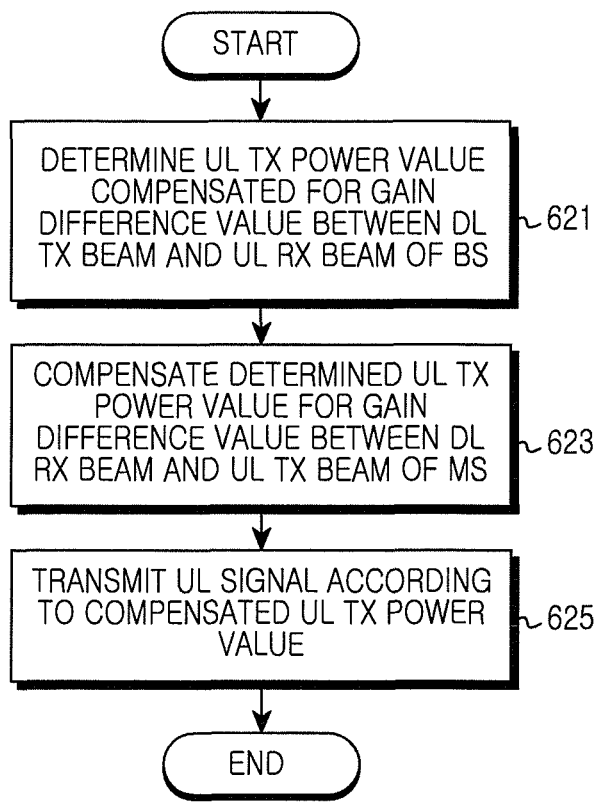
Figure 7A:
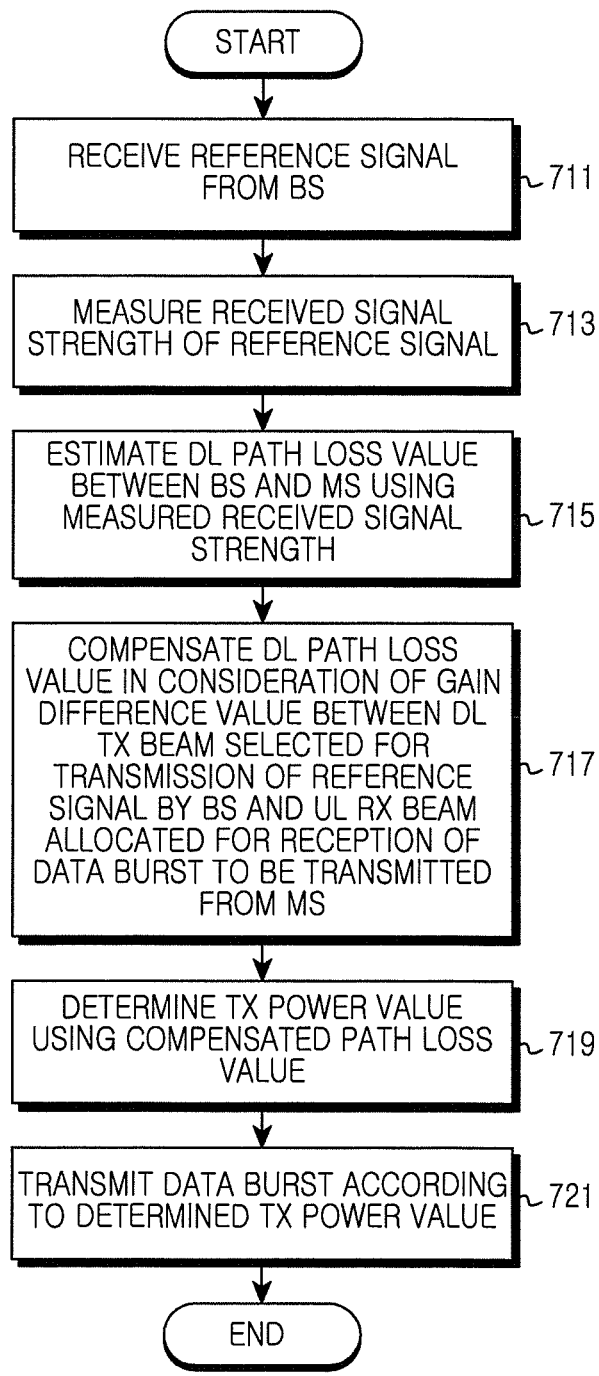
Figure 7B:
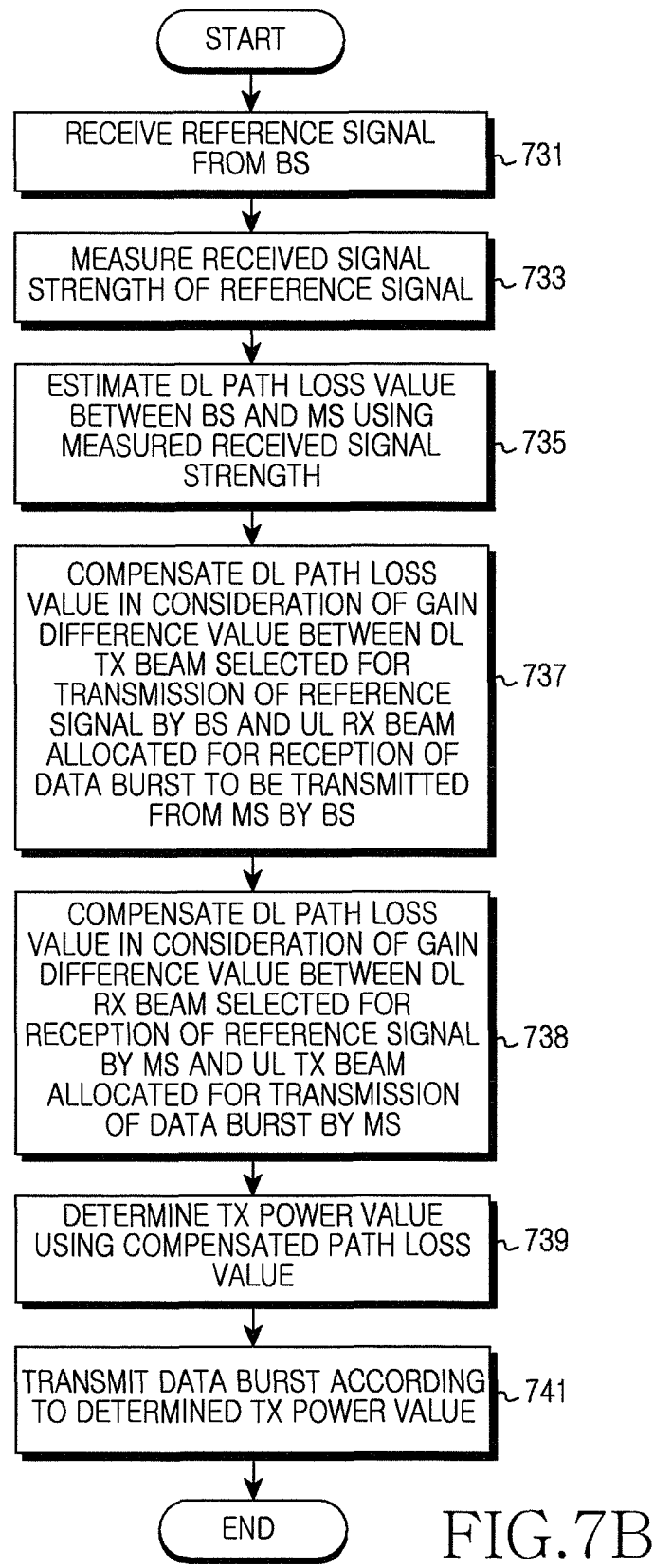
Figure 8A:
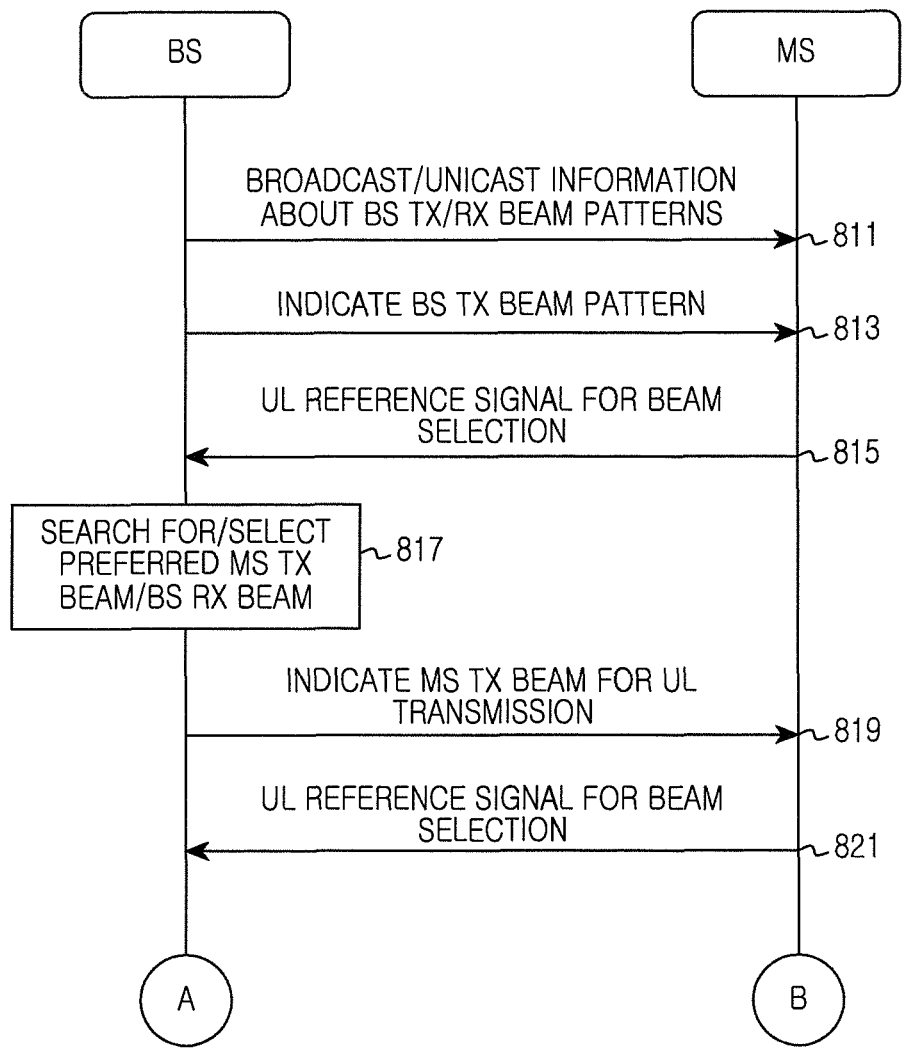
Figure 8B:
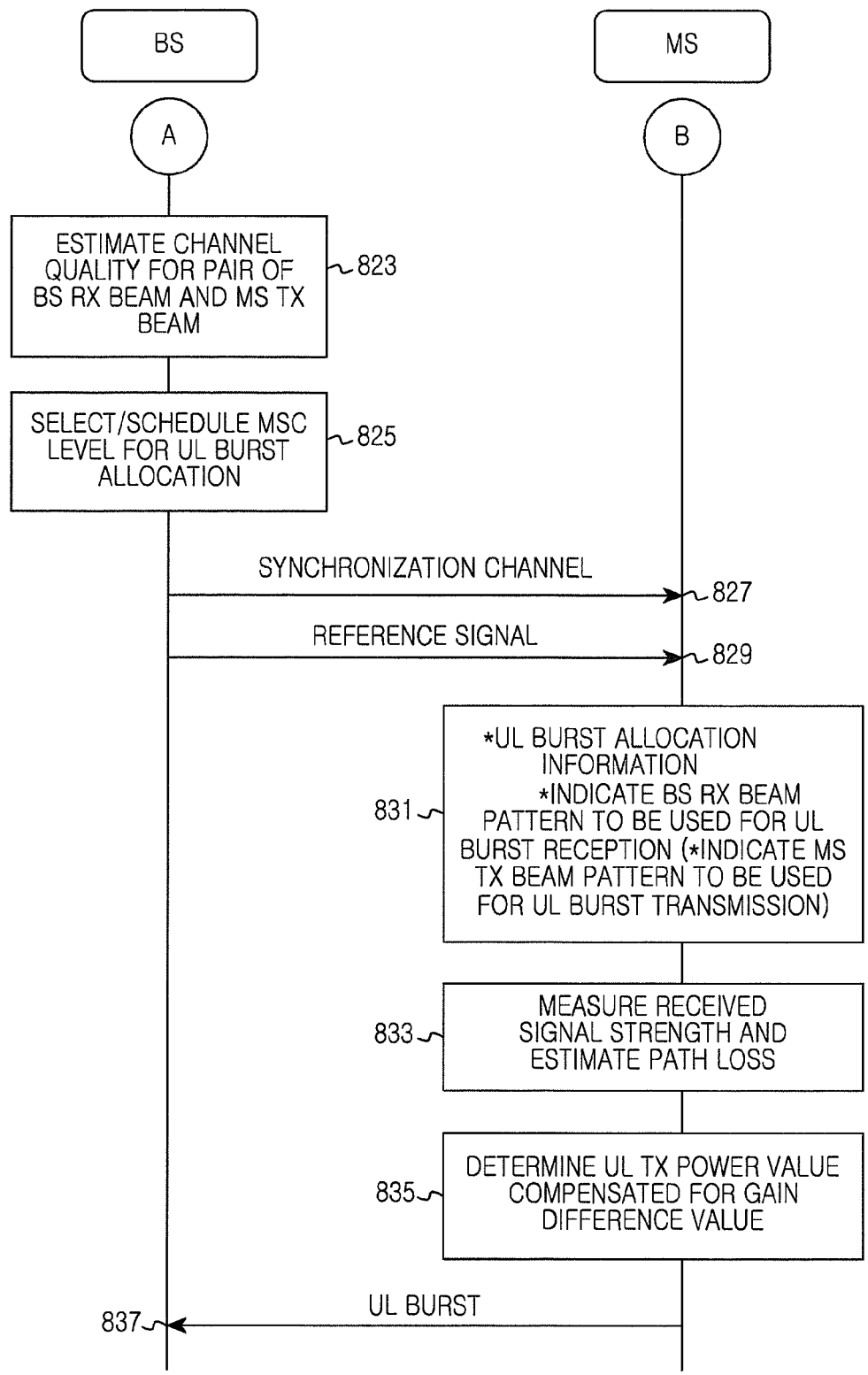

FIG. 3B illustrates an example of forming a beam having a wide width to be used for transmission/reception of data as illustrated in FIG. 2B in the hybrid beamforming structure as illustrated in FIG. 1;

FIG. 4 illustrates a configuration of a BS to which embodiments of the present disclosure is applicable;

FIG. 5 illustrates a configuration of a MS to which embodiments of the present disclosure is applicable;

FIG. 6A is a flowchart illustrating Tx power control operation of a MS according to an embodiment of the present disclosure;

FIG. 6B is a flowchart illustrating Tx power control operation of a MS according to another embodiment of the present disclosure;

FIG. 7A is a flowchart illustrating reference signal reception and Tx power control operation of a MS according to an embodiment of the present disclosure;

FIG. 7B is a flowchart illustrating reference signal reception and Tx power control operation of a MS according to another embodiment of the present disclosure;

FIGS. 8A and 8B illustrate a processing flow between a BS and a MS for power control operation according to embodiments of the present disclosure; and FIGS. 9A to 9D illustrate an example of a frame structure of a signal transmitted for respective sectors and an example of usage of different Tx/Rx beam patterns of BS and MS for UL and DL in a relevant frame structure according to embodiments of the present disclosure.

DETAILED DESCRIPTION

FIGS. 1 through 9D, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. Exemplary embodiments of the present disclosure will be described herein below with reference to the accompanying drawings. The following descriptions involve many specific details so as to provide thorough understanding of the disclosure. However, it is obvious to the person skilled in the art that the disclosure can be implemented without the specific details. In the following description, well-known methods, procedures, components, circuits and networks are not described in detail.

Embodiments of the present disclosure which will be described below provide a method and apparatus for performing beamforming in a beamforming-based wireless mobile communication system which uses beams having one or more beam patterns having directivity for uplink/downlink. Herein, the beam pattern refers to a pattern that allows a beam to have a specific beamwidth and a specific beamforming gain in a specific direction. Specifically, embodiments of the present disclosure provides a method and apparatus for performing efficient uplink power control through compensation for a beam gain difference between a reference signal and a control/data channel due to change in a beam pattern or a gain difference between a downlink (DL) Transmit (Tx)/Receive (Rx) beam and an uplink (UL) Tx/Rx beam. Beamforming technology to which embodiments of the present disclosure are applicable and an example of a configuration of a wireless communication system supporting beamforming will be firstly described below. Subsequently, embodiments of the present disclosure will be described.

A beamforming-based wireless communication system may support Transmit beamforming and Receive beamforming. Transmit beamforming is generally a method of increasing directivity by concentrating arrival areas of radio waves in a specific direction using a plurality of antennas. A set of multiple antennas is called an antenna array, and each antenna included in the antenna array is called an array element. The antenna array may have a variety of types, including a linear array and a planar array. With the use of the transmit beamforming, the transmission distance may be increased due to the increase in directivity of signals, and signals are not transmitted in directions other than a specific direction, so signal interference to users other than the user associated with the specific direction may be significantly reduced.

Receive beamforming is generally a method of performing beamforming on received signals using an Rx antenna array. The receive beamforming may increase the sensitivity of signals received in a specific direction by concentrating received radio waves in the specific direction, and blocking interference signals by excluding signals received in directions other than the specific direction from the received signal.

Signal transmission from a base station (BS) supporting beamforming to a mobile station (MS) is performed as described below. The BS transmits a plurality of beamformed signals simultaneously or consecutively by sweeping the signals. Depending on terminal implementations, a terminal may support omni-directional transmission while not supporting receive beamforming, may apply only one of specific beamforming patterns at a time during transmission while supporting receive beamforming, or may simultaneously supply a plurality of transmit beamforming patterns in different directions while supporting receive beamforming. As for a MS which does not support receive beamforming, the MS measures channel qualities with respect to a reference signal respectively for a plurality of Tx beams of a BS, and reports the channel qualities to the BS to enable the base station to select a beam best to the MS among the Tx beams. In the case of a MS supporting receive beamforming, the MS measures channel qualities for a plurality of Tx beams of a BS with respect to a Rx beam pattern, and reports all or some high-ranked measurements for BS Tx-MS Rx beam pairs to the BS to enable the BS to allocate an appropriate Tx beam to the MS based on the measurements. When the MS may receive several Tx beams of the BS simultaneously or support a plurality of BS Tx-MS Rx beam pairs, the BS may perform beam selection in consideration of diversity transmission through repeated transmission or simultaneous transmission.

FIG. 1 illustrates a configuration of a BS transmitter supporting beamforming in which a block diagram of a physical (PHY) layer of the BS transmitter is illustrated as an example. Generally, a wireless mobile communication system supporting beamforming may use Tx beams or Rx beams having one or more beam patterns through analog beamforming, digital beamforming or hybrid beamforming that is a combination thereof. FIG. 1 illustrates a hybrid structure that applies analog beamforming and digital beamforming simultaneously as an example.

Referring to FIG. 1, the transmitter includes a plurality of channel encoders 111 to 119, a plurality of modulators 121 to 129, a MIMO encoder 130, a pre-coder 140, a plurality of radio frequency (RF) paths 150-1 to 150-$N_f$, an analog beamforming block 160, and an antenna array 170. The plurality of channel encoders 111 to 119 encodes signals to be transmitted, and the plurality of modulators 121 to 129 modulates signals encoded by the plurality of channel encoders 111 to 119. The MIMO encoder 130 encodes modulated signals provided from the plurality of modulators 121 to 129 and outputs a plurality of streams (for example, the number thereof is $M_T$). The pre-coder 140 encodes the plurality of streams provided from the MIMO encoder 130 using pre-codes for digital beamforming and outputs a plurality of (for example, $N_f$) encoded streams.

The plurality of RF paths 150-1 to 150-$N_f$ each process the streams provided from the pre-coder 140 according to a predetermined transmission method (for example, Orthogonal Frequency Division Multiple Access (OFDMA)) and output RF signals for transmission. The first RF path 150-1 includes an Inverse Fast Fourier Transform (IFFT) operator 151, a Parallel to Serial (P/S) converter 153, a Cyclic Prefix (CP) adder 155, and a Digital to Analog Converter (DAC) 157. The IFFT operator 151 receives the streams output from the pre-coder 140 and performs IFFT on the steams to output parallel symbols in time domain. The P/S converter 153 converts (multiplexes) the parallel symbols output from the IFFT operator 151 to a serial signal in time domain and outputs the serial signal. The CP adder 155 adds a cyclic prefix code to the serial signal in time domain and outputs the serial signal. The DAC 157 converts a digital signal output from the CP adder 155 to an analog signal and outputs the analog signal. The remaining RF paths 150-2 to 150-$N_f$ have the same configuration and operate in the same manner as the first RF path 150-1.

Analog signals output from the plurality of RF paths 150-1 to 150-$N_f$ are respectively divided into a plurality of signals (for example, $N_a$) by a plurality of signal dividers 159-1 to 159-$N_f$ and then provided to the analog beamforming block 160. Herein, $N_a$ is the number of antenna elements. The analog beamforming block 160 are provided with the plurality of signals by the plurality of RF paths 150-1 to 150-$N_f$ through the signal dividers and forms a beam to be transmitted in a specific direction through control of phases and amplitudes with respect to the plurality of antenna elements. Specifically, the analog beamforming block 160 includes a phase shifter 161 for control of phases of the plurality of antenna elements, a combiner 163 that combines signals of the respective antenna elements of which the phases have been controlled by the phase shifter 161, a power amplifier PA for control of a signal strength for the plurality of antenna elements which are combined by the combiner 163, and a variable gain amplifier (VGA) 165. The antenna array 170 is configured by grouping the plurality of antenna elements. A beamforming gain increases due to he above-described configuration.

As described above, the BS transmitter that supports beamforming may be configured in a hybrid structure in which analog beamforming and digital beamforming are applied simultaneously. That is, after the DAC 157, the analog beamforming block 160 forms a beam to be transmitted in a specific direction by control of phases and signal strengths of the plurality of antenna elements through the plurality of phase shifters, the power amplifier, and the variable gain amplifier. In this case, the beamforming gain is increased by configuring the antenna array 170 by grouping the plurality of antenna elements. On the other hand, the RF paths including the plurality of IFFTs 151 before the DAC 157, the MIMO encoder 130, and the pre-coder 140 maybe may be used not only to additionally improve the beamforming gain, but to provide management of multiple users, frequency selective allocation, or formation of multiple beams. Although the beamforming structure is configured as illustrated in FIG. 1, the present disclosure is not limited to the configuration. The beamforming structure may be implemented in various forms through modification in and combination of the plurality of blocks illustrated in FIG. 1. In addition, although there are omitted a beam setting unit for selecting and determining a Tx beam, a control unit and the like because the physical layer of the BS transmitter is only illustrated, it is apparent to those skilled in the art that the components are needed for overall Tx beamforming operation.

A MS receiver corresponding to the BS transmitter illustrated in FIG. 1 may be configured inversely to the structure illustrated in FIG. 1. For example, physical layer processing blocks of the MS receiver may be implemented in the order of an Rx antenna array, an analog Rx beamforming block, a RF reception path, a pose decoding unit, a MIMO decoding unit, a channel demodulator, and a channel decoding unit. In this case, the RF reception path may include an Analog to Digital Converter (ADC), a CP remover, a serial to parallel converter, and a Fast Fourier Transform (FFT) operator.

Embodiments of the present disclosure may use one or more beams having different beamwidths and beam gains differently through analog beamforming in the system having the hybrid beamforming structure as illustrated in FIG. 1. Specifically, embodiments of the present disclosure may use one or more beams having different beamwidths and beam gains differently according to a reference signal/data channel/control channel, in consideration of a MS's mobility and channel characteristics, or according to UL/DL or transmission/reception. A beam selected under the above considerations is generated by adjusting beamforming coefficients to have a specific beamwidth and a specific beam gain. In a case of setting beams to have the same antenna input power, as the beamwidth of a beam is wider, a maximum beam gain decreases with respect to the directivity direction of the beam.

FIGS. 2A and 2B illustrate an example of a communication scenario between a BS using a plurality of Tx beams and a MS supporting a plurality of Rx beams within one BS sector. Referring to FIG. 2A, the BS transmits a reference signal by performing sweeping using a beam having a narrow beamwidth in order for link adaptation including modulation and coding scheme (MCS) level setting and power control for data transmission and reception with respect to a relevant MS. On the other hand, referring to FIG. 2B, the BS transmits and receives data to and from the relevant MS using a beam having a wide beamwidth.

FIG. 3A illustrates an example of forming a plurality of beams having a narrow width to be used for transmission/reception of a reference signal as illustrated in FIG. 2A in the hybrid beamforming structure as illustrated in FIG. 1. Referring to FIG. 3A, there is illustrated an example in which a plurality of basic unit beams are formed such that a 180-degree sector is divided uniformly into 160 portions by a wave number based on a beam coefficient, such as a Discrete Fourier Transform (DFT) matrix, with respect to a 16×1 uniform linear array (ULA) in the hybrid beamforming structure as illustrated in FIG. 1 In this case, the respective basic unit beams are generated to have the same maximum beam gain in a specific direction and to uniformly support the 180-degree sector entirely within the same beam gain range.

FIG. 3B illustrates an example of forming a beam having a wide width to be used for transmission/reception of data as illustrated in FIG. 2B in the hybrid beamforming structure as illustrated in FIG. 1. Referring to FIG. 3B, there is illustrated an example of a beam pattern in a case of superposing two unit beams adjacent to both sides of a basic unit beam at a zero degree direction from the basic unit beam formed as described with reference to FIG. 3A. The example corresponds to a case of applying normalization with respect to beam coefficients according to the number of beams superposed such that gains for all antennas are identical to each other in an analog stage when selected beams are superposed. According to the normalization, due to superposition of unit beams, directivity in a specific direction is reduced and a beamwidth increases. On the other hand, a maximum beam gain in a specific direction is decreased. Therefore, there is a need to determine the number of unit beams to be superposed in consideration of the above-described trade-off in an actual system. In addition, there is a need to perform link adaptation, such as MSC setting considering reduction of the beam gain of a superposed beam.

FIGS. 4 and 5 illustrate configurations of a BS and a terminal which embodiments of the present disclosure are applicable to. It is assumed that the BS and the terminal both support transmit beamforming and receive beamforming. The BS and the terminal transmit and receive a plurality of beamformed signals by sweeping them simultaneously or successively.

Referring to FIG. 4, the BS includes a receiving unit 210, a transmitting unit 220, a beam selecting unit 230, a CINR estimating unit 240, and an UL burst scheduler 250. The receiving unit 210 that is a component for signal reception operation supports receive beamforming. The receiving unit 210 may include receiver components corresponding to the transmitter components illustrated in FIG. 1. For example, the receiving unit 210 may be implemented by including a receiving antenna array, an analog receive beamforming block, a RF receiving path, a MIMO decoding unit, a channel modulating unit, and a channel decoding unit. The RF receiving path may include an analog-digital converter, a CP remover, a serial-parallel converter, and a Fast Fourier Transform (FFT) operator. The transmitting unit 220, which is a component for signal transmission operation, supports transmit beamforming and includes the transmitter components illustrated in FIG. 1. For example, the transmitting unit 220 may be implemented by including a channel encoding unit, a channel modulating unit, a MIMO encoding unit, a pre-coder, a RF transmitting path, an analog transmit beamforming block, and a transmitting antenna array.

The beam selecting unit 230 selects a Tx beam having a beamwidth and a beamforming gain with respect to a specific direction among a plurality of transmit beams. In addition, the beam selecting unit 230 selects an Rx beam having a beamwidth and a beamforming gain with respect to a specific direction among a plurality of receive beams. Herein, selecting a specific beam means generating a relevant specific beam by adjusting analog/digital beamforming coefficients as illustrated in FIG. 1. For example, the beam selecting unit 230 selects a beam having a relatively narrow beamwidth in a case of transmitting and receiving a reference signal. As another example, the beam selecting unit 230 selects a beam having a relatively wide beamwidth in a case of transmitting and receiving data or in a case of transmitting a synchronization channel/broadcast channel. Although the beam selecting unit 230 is illustrated as selecting a beam having a relatively narrow beamwidth in a case of transmitting and receiving a reference signal and selecting a beam having a relatively wide beamwidth in a case of transmitting and receiving data or in a case of transmitting a synchronization channel/broadcast channel, the present disclosure is not limited to those embodiments. When the terminal sweeps and transmits a UL reference signal (for example, Random Access Channel (RACH)), the beam selecting unit 230 enables reception of the UL reference signal by performing sweeping using receive beams having a narrow beamwidth. In this manner, the beam selecting unit 230 searches for and selects a desired MS Tx beam and a desired BS receive beam.

The CINR estimating unit 240 estimates the CINR of a signal received from a terminal. For example, the CINR estimating unit 240 estimates a CINR for a beam pair including the desired MS Rx beam and BS Tx beam selected by the beam selecting unit 230 when the UL reference signal (for example, a sounding signal) is received from the terminal. In this case, although it is illustrated and described that a quality of a receiving channel is estimated by estimating the CINR for the beam pair including the selected MS Rx beam and the BS transmit beam, the quality of the receiving channel may be estimated through estimation of a Received Signal Strength Indicator (RSSI) and estimation equivalent thereto.

The UL burst scheduler 250 performs scheduling operation associated with UL burst transmission based on a result of estimation by the CINR estimating unit 240. For example, the UL burst scheduler 250 generates allocation information associated with UL burst transmission, such as MCS levels for UL burst allocation. In addition, the UL burst scheduler 250 determines a BS Rx beam pattern to be used for UL burst reception. In addition, the UL burst scheduler 250 may determine a MS Tx beam pattern to be used for UL burst transmission by a MS. The allocation information associated with UL burst transmission, the BS Rx beam pattern to be used for UL burst reception, and the MS Tx beam pattern to be used for UL burst transmission by the MS are transmitted to the MS through the transmitting unit 220.

In addition, the transmitting unit 220 transmits information about a beam gain difference value between the Tx beam pattern and Rx beam pattern of the BS and information about beam gain values for respective beam patterns of the Tx beam and Rx beam of the BS to the MS. In addition, the receiving unit 210 receives information about a gain difference value between the UL Tx beam and DL Rx beam of the MS or information about beam gain values for respective beam patterns of the UL Tx beam and DL Rx beam of the MS beam from the MS.

According to an embodiment of the present disclosure, the transmitting unit 220 transmits information about the gain difference value between the DL Tx beam and UL Rx beam of the BS to the MS. The receiving unit 210 receives an UL signal transmitted from the MS. In this case, the UL signal is a signal transmitted according to an UL Tx power value compensated by the gain difference value between the UL Tx beam and the UL Rx beam by the MS.

In an embodiment, the DL Tx beam is a beam used for transmission of a reference signal to the MS by the BS, and the UL Rx beam is a beam used for reception of a data burst from the MS by the BS.

In an embodiment, the UL transmit power value may be further compensated by the gain difference value between the DL Rx beam and the UL Tx beam in the MS. The DL Rx beam is a beam used for reception of a reference signal from the BS by the MS and the UL Tx beam is a beam used for transmission of the data burst to the BS by the MS.

In an embodiment, the gain difference value between the UL Tx beam and the DL Rx beam is calculated from the beam gain values for the respective beam patterns of the UL Tx beam and the DL Rx beam.

In an embodiment, the UL Tx power value is determined based on a DL path loss value compensated by the gain difference value between the DL Tx beam and the UL Rx beam in the BS. In this case, the DL path loss value may be estimated by the MS based on an Equivalent Isotropic Radiated Power (EIRP) value and the received signal strength of a reference signal which are received from the BS.

Referring to FIG. 5, the BS includes a receiving unit 310, a transmitting unit 320, a beam selecting unit 330, a received signal strength measuring unit 340, a path loss estimating unit 350, and a power control unit 360. The receiving unit 310 that is a component for signal reception operation supports receive beamforming. The receiving unit 310 may include receiver components corresponding to the transmitter components illustrated in FIG. 1. For example, the receiving unit 310 may be implemented by including a receiving antenna array, a analog receive beamforming block, a RF receiving path, a MIMO decoding unit, a channel modulating unit, and a channel decoding unit. The RF receiving path may include an analog-digital converter, a CP remover, a serial-parallel converter, and a Fast Fourier Transform (FFT) operator. The transmitting unit 320, which is a component for signal transmission operation, supports transmit beamforming and includes the transmitter components illustrated in FIG. 1. For example, the transmitting unit 320 may be implemented by including a channel encoding unit, a channel modulating unit, a MIMO encoding unit, a pre-coder, a RF transmitting path, an analog transmit beamforming block, and a transmitting antenna array.

The beam selecting unit 330 selects a Tx beam having a beamwidth and a beamforming gain with respect to a specific direction among a plurality of transmit beams. In addition, the beam selecting unit 230 selects an Rx beam having a beamwidth and a beamforming gain with respect to a specific direction among a plurality of receive beams. Herein, selecting a specific beam means enabling generation of a relevant specific beam by adjusting analog/digital beamforming coefficients as illustrated in FIG. 1. For example, the beam selecting unit 330 selects transmission beams such that an UL reference signal, such as RACH, is swept and transmitted. As another example, the beam selecting unit 330 selects a relevant Tx beam such that an UL reference signal, such as a sounding signal, and UL data are transmitted through the selected transmission beam. As another example, the beam selecting unit 330 selects reception beams such that a reference signal or a synchronization channel/broadcast channel is received by sweeping the reception beams when the BS transmit the reference signal or the synchronization channel/broadcast channel is received.

The received signal strength measuring unit 340 receives the reference signal or the synchronization channel/broadcast channel from the BS and measures the reception signal value or received signal strength (RSSI). The path loss estimating unit 350 estimates a DL path loss value between the BS and MS using the measured reception signal value. In addition, the path loss estimating unit 350 compensates the estimated path loss value by a beam gain according to a difference between the Tx/Rx beam patterns of the BS. The power control unit 360 determines a Tx power value using the compensated path loss value, and controls the Tx power of an UL data burst according to the determined Tx power value.

The configurations illustrated in FIGS. 4 and 5 are BS and MS configurations according to embodiments of the present disclosure which are for performing UL power control operation in consideration of path loss estimation by the MS and compensation of gain difference values between Tx/Rx beams of the BS and between Tx/Rx beams of the MS for UL and DL. The BS and the MS may share information about the gain difference value between the Tx/Rx beams of the BS and information about the gain difference value between the Tx/Rx beams of the MS with each other. For this, the receiving unit 310 receives information about a gain difference value between the DL Tx beam and UL Rx beam of the BS or information about beam gain values for respective beam patterns of the DL Tx beam and UL Rx beam from the BS.

In an embodiment, the BS may broadcast or unicast, to all MSs within a cell/sector, a gain difference value between a beam used for reference signal transmission and a beam used for UL data reception, which is used for path loss estimation.

In another embodiment, the BS may broadcast or unicast, to the MS, beam gain difference values of respective Rx beam patterns applied for respective MSs by the BS against a reference Tx beam for a specific BS, or the MS may regularly/irregularly report a beam pattern to be applied to the UL power control to the BS.

In another embodiment, the BS may transmit to the MS information including a table indicating Tx beam patterns (or type) of the BS and corresponding beam gain value for each Tx beam pattern, a table indicating Rx beam patterns of the BS and corresponding beam gain value for each Rx beam pattern, an index indicating a Tx beam for the DL link from the BS to the corresponding MS among the Tx beams, and an index indicating an Rx beam for the UL link among the Rx beams. Similarly, the MS may transmit to the BS information including a table indicating Tx beam patterns (or type) of the MS and corresponding beam gain value for each Tx beam pattern, and a table indicating Rx beam patterns of the MS and corresponding beam gain value for each Rx beam pattern. The MS or the BS may select a Tx beam to be used for the UL link of the MS and an Rx beam to be used for the DL link of the MS. For one example, the MS selects the Tx beam to be used for the UL link of the MS and the Rx beam to be used for the DL link of the MS, and informs information regarding the selected Tx beam and Rx beam of the BS. For another example, the BS schedules and selects the Tx beam to be used for the UL link of the MS and the Rx beam to be used for the DL link of the MS based on information received from the MS, and informs information regarding the selected Tx beam and Rx beam of the MS.

Table 1 and Table 2 are examples of an information table that may be included in a message reporting beam gain difference values of Rx beam patterns of the BS with respect to a specific reference Tx beam which is transmitted from the BS to the MS. In other words, Table 1 and Table 2 represent examples of beam gain differences between Tx/Rx beams of the BS or the MS in an absolute value form or a relative value form, respectively.

TABLE 1

| Array Gain Difference against Beam_Type_1 | dB |
|---|---|
| Beam_Type_2 | −4.7712 |
| Beam_Type_3 | −6.9897 |
| Beam_Type_4 | −8.4510 |
| Beam_Type_5 | −9.5424 |
| Beam_Type_6 | −10.4139 |

Table 1 represents gain difference values of respective beams against Beam_Type_1. For example, Beam_Type_2 represents a gain difference of −4.7712 (dB) against Beam_Type_1, Beam_Type_3 represents a gain difference of −6.9897 (dB) against Beam_Type_1, and Beam_Type_4 represents a gain difference of −8.4510 (dB) against Beam_Type_1.

TABLE 2

| Array Gain Difference against Beam_Type_(x − 1) | dB |
|---|---|
| Delta_Beam_Type_2 | −4.7712 |
| Delta_Beam_Type_3 | −2.2185 |
| Delta_Beam_Type_4 | −1.4613 |
| Delta_Beam_Type_5 | −1.0914 |
| Delta_Beam_Type_6 | −0.8715 |

Table 2 represents gain difference values between neighboring beams. For example, Beam_Type_2 represents a gain difference of −4.7712 (dB) against Beam_Type_1, Beam_Type_3 represents a gain difference of 2.2185(=6.9897−4.7712)(dB) against Beam_Type_2, and Beam_Type_4 represents a gain difference of −1.4613(=8.4510−6.9897)(dB) against Beam_Type_3.

As described above, the BS may share information about the beam gain difference value between the Tx beam pattern and the Rx beam pattern of the BS with the MS by transmitting the information to the MS. Alternatively, the BS may share the beam gain values for respective beam patterns of the Tx beam and Rx beam of the BS with the MS by transmitting the beam gain values to the MS. Therefore, the beam gain difference value between the Tx beam pattern and Rx beam pattern of the BS may be calculated. In this case, the receiving unit 310 of FIG. 5 receives information about the beam gain difference value between the Tx beam pattern and Rx beam pattern of the BS or information about the beam gain values for respective beam patterns of the Tx beam and Rx beam of the BS from the BS.

In addition, the MS may share information about the beam gain difference value between the Tx beam pattern and the Rx beam pattern of the MS with the BS by transmitting the information to the BS. Alternatively, the MS may share the beam gain values for respective beam patterns of the Tx beam and Rx beam of the MS with the BS, and therefore, the beam gain difference value between the Tx beam pattern and Rx beam pattern of the MS may be calculated. In this case, the transmitting unit 320 of FIG. 5 transmits information about a gain difference value between the UL Tx beam and DL Rx beam of the MS or information about beam gain values for respective beam patterns of the UL Tx beam and the DL Rx beam to the BS.

An UL Tx power control operation according to embodiments of the present disclosure is performed by compensating a beam gain due to a difference between Tx/Rx beam patterns of the MS and the BS to perform the UL power control of the MS.

Generally, the UL Tx power control operation is determined based on path loss compensation, external interference and noise compensation, and a target Signal to Interference-plus-Noise Ratio (SINR) or a required SINR as shown in Equations (1) and (2).

$$P(\text{dBm}) = PL + CNR + R + (N+I) + 10 \log 10(BW) + \text{Offset\_SS} + \text{Offset\_BS} \quad (1)$$

$$P(\text{dBm}) = PL + SINR_{Target} + NI + \text{Offset} \quad (2)$$

where P denotes a Tx power of a MS, PL denotes a path loss, (N+I) or NI represent external noise and interference, CNR or $SINR_{Target}$ denotes a target Signal to Interference-plus-Noise Ratio (SINR) or a required SINR, R is denotes a repetition factor, and BW denotes a total allocated bandwidth, and Offset denotes an offset value. When the MS receives information about an Equivalent Isotropic Radiated Power (EIRP) value for a DL from the BS, the path loss may be calculated using a Rx power value measured through a reference signal transmitted through the DL from the BS as shown in Equation (3):

$$PL = BS_{EIRP} - RSS \quad (3)$$

where $BS_{EP}$ denotes an EIRP value and RSS denotes a Rx power value measured through a reference signal transmitted through a DL from the BS.

According to embodiments of the present disclosure, beam gains according to beamforming effects are reflected to a Tx signal of a BS and a Rx signal of a MS in a system that is operated based on transmit/receive beamforming in the MS and the BS. According to a difference between a pair of BS Tx beam and MS Rx beam used for a reference signal for path loss measurement and a pair of BS Rx beam and MS Tx beam used actually for UL data transmission and reception, a difference is generated according to the gain difference between the Tx/Rx Beams with respect to a required Tx power value of the MS. Therefore, the system operating based on beamforming needs to perform UL power control by reflecting a beam gain difference according to a difference between Tx/Rx beams of UL/DL. Equations for a path loss according to embodiments of the present disclosure reflecting the beam gain difference value may be expressed by Equations (4) to (6).

$$PL_{comp}(\text{dB}) = PL + \Delta P_S = BS_{EIRP}(\text{dBm}) - RSS(\text{dBm}) + \Delta P_S(\text{dB}) \approx \quad (4)$$
$$BS_{EIRP}(\text{dBm}) - RSS(\text{dBm}) + \Delta G_{array}^{MS}(\text{dB}) + \Delta G_{array}^{BS}(\text{dB})$$

$$\Delta G_{array}^{BS} = G_{TX}^{BS} - G_{RX}^{BS} \quad (5)$$

$$\Delta G_{array}^{MS} = G_{RX}^{MS} - G_{TX}^{MS} \quad (6)$$

In the UL power control operation according to embodiments of the present disclosure, a path loss value is compensated from two aspects.

First, as shown in Equation (5), the path loss value is compensated in consideration of a gain difference value $\Delta G_{array}^{BS}$ between the gain of a DL Tx beam $G_{TX}^{BS}$ selected by the BS for transmission of the reference signal and the gain $G_{Rx}^{BS}$ of a UL RX beam allocated for reception of a data burst to be transmitted by the MS.

Second, as shown in Equation (6), the path loss value is compensated in consideration of a gain difference value $\Delta G_{array}^{MS}$ between the gain $G_{RX}^{MS}$ of a DL Rx beam selected by the MS for reception of the reference signal and the gain $G_{TX}^{MS}$ of an UL Tx beam allocated for data burst transmission.

For the compensation operation, the BS reports, to the MS, the difference value between the Tx beam gain $G_{TX}^{BS}$ and the Rx beam gain $G_{RX}^{BS}$ according to a difference between a beam pattern of Tx beams applied to the reference signal of the BS and a beam pattern of Rx beams to be used to receive UL data from the MS as shown in Equation (5).

The MS compensates a path loss value in consideration of a gain difference value $\Delta G_{array}^{BS}$ between the Tx/Rx beams of the BS received from the BS and a gain difference value $\Delta G_{array}^{MS}$ between the Tx/Rx beams according to a beam pattern difference between the Rx beam of the MS used to receive the reference signal of the BS and the Tx beam of the MS used to transmit data to an UL. Thereafter, the MS determines the Tx power value by using the compensated path loss value and controls UL Tx power according to the determined Tx power value.

Embodiments of the present disclosure are described as controlling UL Tx power in consideration of both a gain difference value $\Delta G_{array}^{BS}$ between the Tx/Rx beams of the BS and a gain difference value $\Delta G_{array}^{MS}$ between the Tx/Rx beams according to difference in beam patterns of Tx beams of the MS. Alternatively, it is possible to control UL Tx power in consideration of only one of the gain difference value $\Delta_{array}^{BS}$ between the Tx/Rx beams of the BS and a gain difference value $\Delta G_{array}^{MS}$ between the Tx/Rx beams according to a difference between beam patterns of Tx beams of the MS.

In addition, the BS is described as reporting the gain difference value of Tx/Rx beams of the BS to the MS. Alternatively, when the BS reports a Tx beam gain value and an Rx beam gain value to the MS, the MS may calculate the beam gain difference value between Tx/Rx beams of the BS.

FIG. 6A is a flowchart illustrating Tx power control operation of a MS according to an embodiment of the present disclosure. In step 611, the MS determines an UL Tx power value in which a gain difference value between the DL Tx beam and UL Rx beam of a BS is compensated. As an embodiment, information about the gain difference value between the DL Tx beam and UL Rx beam of the BS may be received from the BS. As another embodiment, when information about beam gain values for respective beam patterns of the DL Tx beam and UL Rx beam of the BS is received from the BS, the gain difference value between the DL Tx beam and the UL Rx beam may be calculated. In step 613, the MS transmits an UL signal according to the determined UL Tx power value.

FIG. 6B is a flowchart illustrating Tx power control operation of a MS according to another embodiment of the present disclosure. In step 621, the MS determines an UL Tx power value in which a gain difference value between the DL Tx beam and UL Rx beam of a BS is compensated. As an embodiment, information about the gain difference value between the DL Tx beam and UL Rx beam of the BS may be received from the BS. As another embodiment, when information about beam gain values for respective beam patterns of the DL Tx beam and UL Rx beam of the BS is received from the BS, the gain difference value between the DL Tx beam and the UL Rx beam may be calculated. In step 623, the MS compensates the determined UL Tx power value based on the gain difference value between the DL Rx beam and UL Tx beam of the MS. In step 625, the MS transmits an UL signal according to the determined UL Tx power value.

In the embodiments illustrated in FIGS. 6A and 6B, the DL Tx beam has a relatively narrow beamwidth compared to the UL Rx beam. The UL Tx beam includes a beam that is used for transmission of a reference beam to the MS by the BS. The UL Rx beam includes a beam that is used for reception of a data burst from the MS by the BS. The MS may receive information about the gain difference value between the DL Tx beam and the UL Rx beam from the BS. The DL Rx beam includes a beam that is used for reception of the reference signal transmitted from the BS by the MS. The UL Tx beam includes a beam that is used for transmission of a data burst to the BS by the MS.

As an embodiment, the step of determining the UL Tx power value includes estimating an UL path loss between the BS and the MS, compensating the estimated path loss value for the gain difference value, and determining the UL Tx power value using the compensated path loss value. As another embodiment, the step of determining the UL Tx power value may further include receiving an EIRP value for a DL from the BS and measuring an Rx power value of the reference signal received from the BS. The step of determining the path loss value estimates the path loss value using the EIRP value and the Rx power value.

FIG. 7A is a flowchart illustrating reference signal reception and Tx power control operation of a MS according to an embodiment of the present disclosure. In step 711, the MS receives a reference signal from a BS. In step 713, the MS measures a received signal strength of the reference signal. In step 715, the MS estimates a DL path loss value between the BS and the MS by using the measured received signal strength. The step of estimating the DL path loss value estimates the path loss value by using an EIRP value for a DL received from the BS and the measured Rx power value. In step 717, the MS compensates the path loss value in consideration of a gain difference value between a DL Tx beam selected for transmission of the reference signal by the BS and an UL Rx beam allocated for reception of a data burst to be transmitted from the MS. As an embodiment, information about the gain difference value between the DL Tx beam selected for transmission of the reference signal and the UL Rx beam allocated for reception of a data burst to be transmitted from the MS may be received from the BS. As another embodiment, when information about beam gain values for respective beam patterns of the DL Tx beam selected for transmission of the reference signal and the UL Rx beam allocated for reception of the data burst to be transmitted from the MS of the BS is received from the BS, the gain difference value between the DL Tx beam and the UL Rx beam may be calculated. In step 719, the MS determines a TX power value by using the compensated path loss value. In step 721, the MS transmits the data burst according to the determined Tx power value.

FIG. 7B is a flowchart illustrating reference signal reception and Tx power control operation of a MS according to another embodiment of the present disclosure. In step 731, the MS receives a reference signal from a BS. In step 733, the MS measures a received signal strength of the reference signal. In step 735, the MS estimates a DL path loss value between the BS and the MS by using the measured received signal strength. The step of estimating the DL path loss value includes determining the path loss value by using an EIRP value for a DL received from the BS and the measured Rx power value. In step 737, the MS compensates the path loss value in consideration of a gain difference value between a DL Tx beam selected for transmission of the reference signal by the BS and an UL Rx beam allocated for reception of a data burst to be transmitted from the MS. As an embodiment, information about the gain difference value between the DL Tx beam selected for transmission of the reference signal and the UL Rx beam allocated for reception of a data burst to be transmitted from the MS may be received from the BS. As another embodiment, when information about beam gain values for the DL Tx beam selected for transmission of the reference signal and the UL Rx beam allocated for reception of the data burst to be transmitted from the MS of the BS is received from the BS, the gain difference value between the DL Tx beam and the UL Rx beam may be calculated. In step 738, the MS compensates the path loss value in consideration of a gain difference value between a DL Rx beam selected for reception of the reference signal by the MS and an UL Tx beam allocated for transmission of the data burst. In step 739, the MS determines a TX power value by using the compensated path loss value. In step 741, the MS transmits the data burst according to the determined Tx power value.

FIGS. 8A and 8B illustrating a processing flow between a BS and a MS for power control operation according to embodiments of the present disclosure. FIGS. 9A to 9D are diagrams respectively illustrating an example of a frame structure of a signal transmitted for respective sectors and an example of usage of different Tx/Rx beam patterns of BS and MS for UL and DL in a relevant frame structure according to embodiments of the present disclosure. The figures illustrate an example in which frames are transmitted and received between the BS and the MS, for example, in the order of FIG. 9A, FIG. 9B, FIG. 9C and FIG. 9D.

Figure 9A:
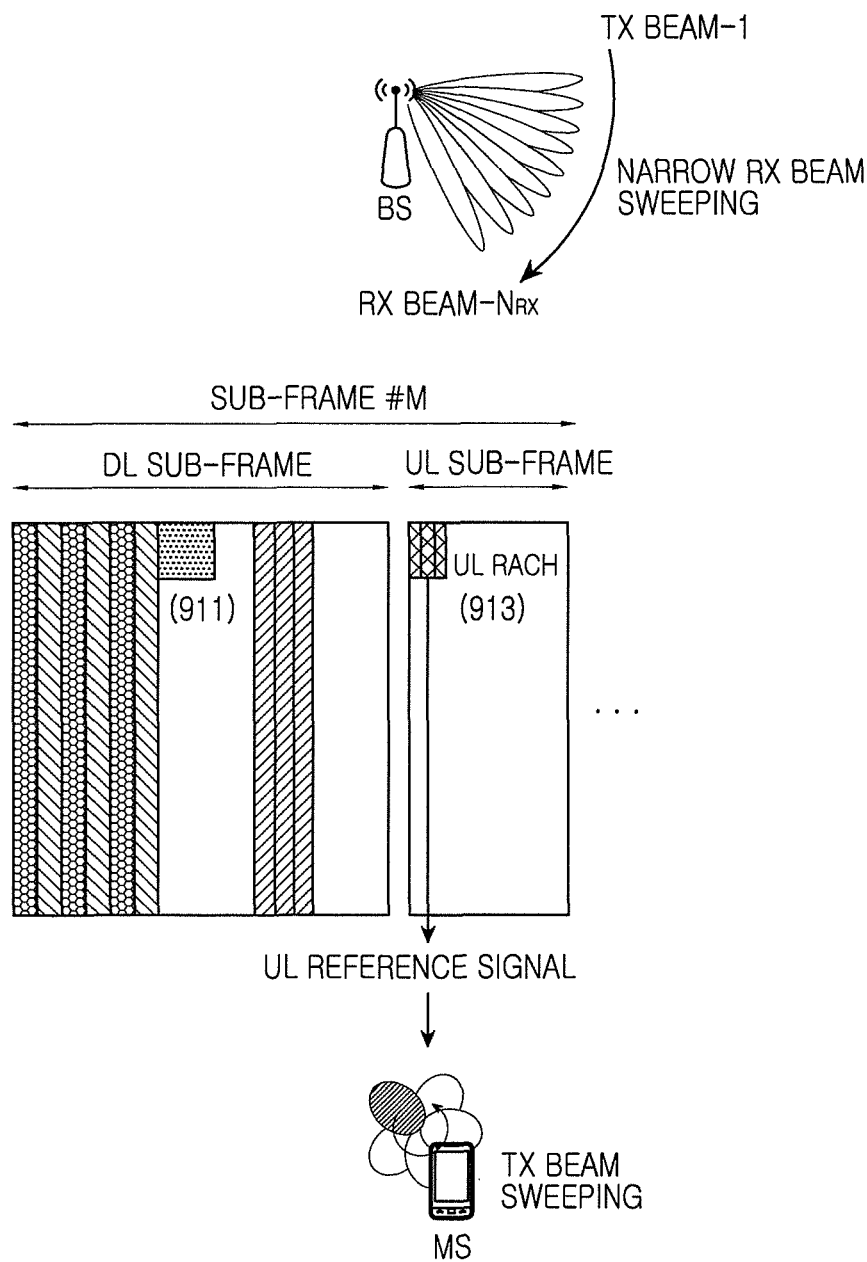

In step 811 of FIG. 8A, the BS broadcasts or unicasts information about BS Tx/Rx beam patterns in different beam directions for transmission/reception of DL and UL. In this case, the information about beam patterns includes information about a beamwidth and a beam gain. In step 813, the BS indicates (broadcasts or unicasts) a Tx beam pattern used for a reference signal, such as Synchronization Channel (SCH) or a Channel State Information Reference Signal (CSI-RS). The frame of a transmitted signal associated with the transmission operation of steps 811 and 813 may have a structure (e.g., sub-frame #M, DL sub-frame 911) as illustrated in FIG. 9A. In step 815, the MS transmits an UL reference signal, such as RACH for beam selection (e.g., sub-frame #M, UL sub-frame 913 in FIG. 9A). In this case, the MS transmits the UL reference signal by sweeping Tx beams. In step 817, the BS receives the UL reference signal through sweeping of an Rx beam having a narrow beamwidth (e.g., sub-frame #M, UL sub-frame 913 in FIG. 9A) and searches for and selects a preferred MS Tx beam and a preferred BS Rx beam.

Figure 9B:
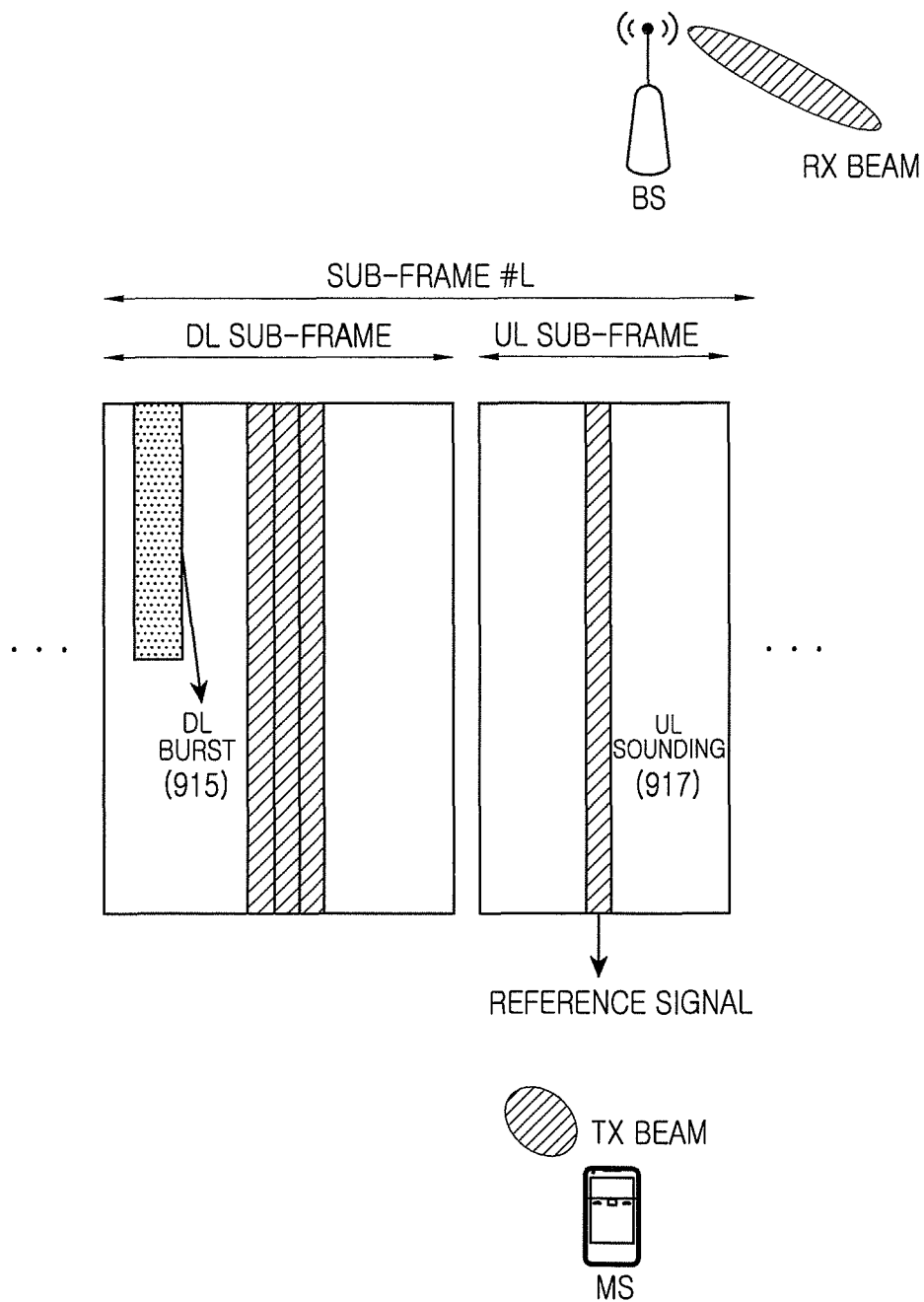

In step 819, the BS indicates a desired MS Tx beam for UL transmission in the MS through transmission of a DL burst (e.g., sub-frame #L, DL sub-frame 915 in FIG. 9B). In step 821, the MS transmits an UL reference signal for beam selection, such as UL sounding signal, by using the MS Tx beam indicated in step 819 (e.g., sub-frame #L, UL sub-frame 917 in FIG. 9B).

In step 823 of FIG. 8B, the BS receives the UL reference transmitted in step 821 by using the BS Rx beam selected in step 817 (e.g., sub-frame #L, UL sub-frame 917 in FIG. 9B) and estimates a channel quality for a beam pair including the selected BS Rx beam/MS Tx beam. As an example, the UL channel quality may be estimated by estimating a CINR for the beam pair including the selected BS Rx beam/MS Tx beam. In step 825, the BS selects and schedules a MCS level for allocation of UL bursts based on the estimated channel quality.

Figure 9C:
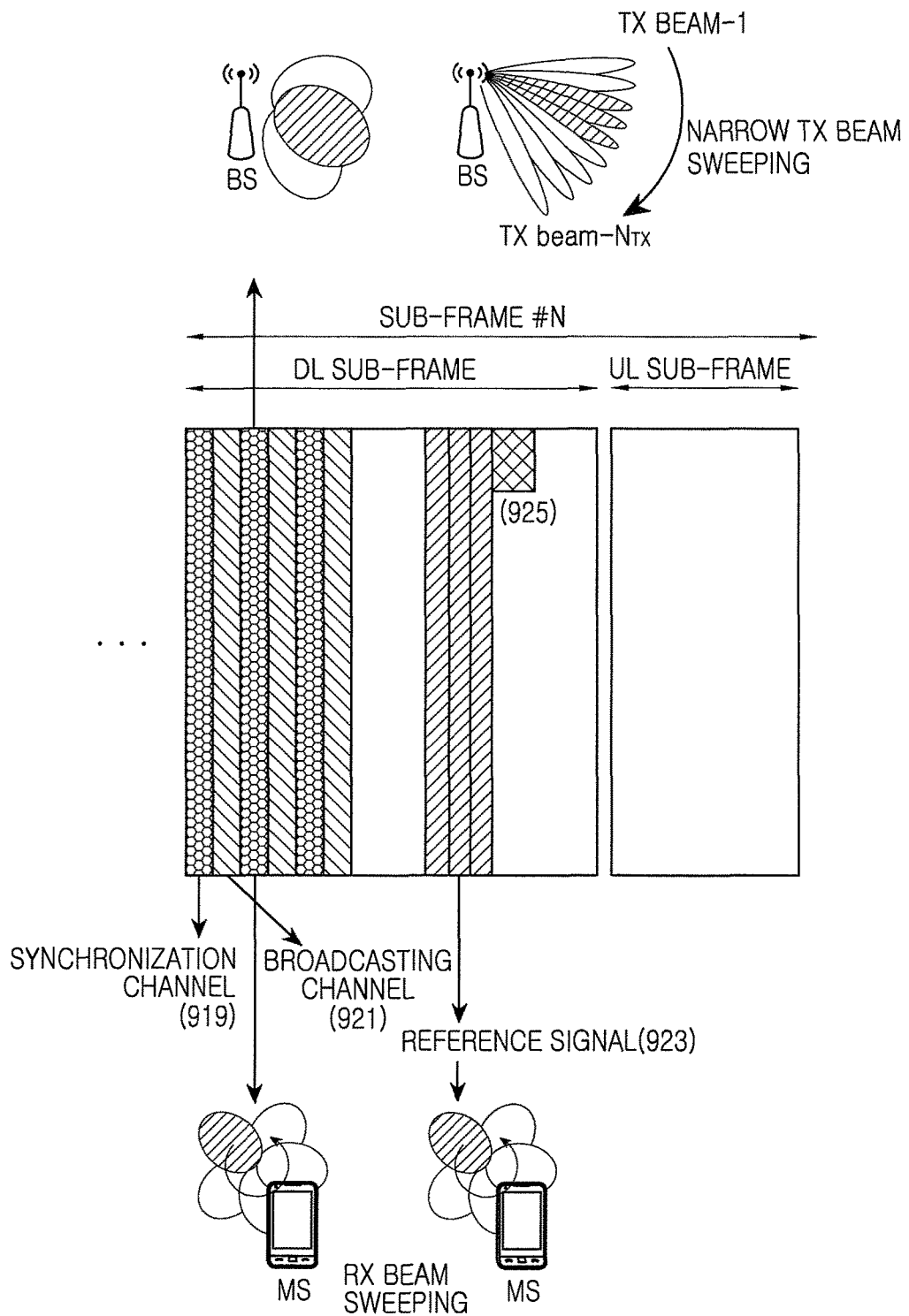
Figure 9D:
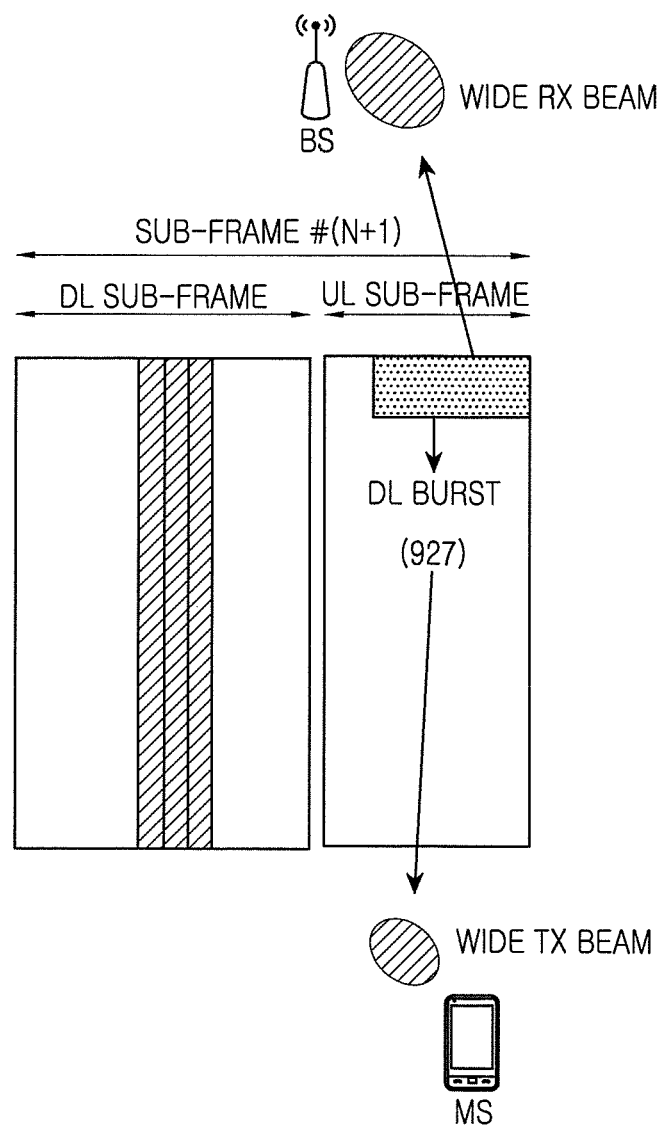

In step 827, the BS transmits a synchronization channel by sweeping Tx beams having a relatively wide beamwidth (e.g., sub-frame #N, UL sub-frame 919 in FIG. 9C). In FIG. 9C, a sub-frame 921 adjacent to a DL sub-frame 919 is a broadcasting channel frame. In step 829, the BS transmits a reference channel, such as midamble, by sweeping Tx beams having a relatively narrow beamwidth (e.g., sub-frame#N, DL sub-frame 923 in FIG. 9C). In step 831, the BS transmits information about UL burst allocation by sweeping Tx beams having a relatively narrow beamwidth, and indicates a BS Rx beam pattern to be used for UL burst reception. In step 831, the BS may indicate a MS Tx beam pattern to be used for UL burst transmission.

In step 827, the MS receives the synchronization channel (e.g., sub-frame #N, DL sub-frame 919 in FIG. 9C) transmitted in step 827 and the reference signal (e.g., sub-frame #N, DL sub-frame 23 in FIG. 9C) transmitted in step 829 through sweeping of Rx beams. In step 833, the MS measures a received signal strength by using the received synchronization channel and the reference signal and estimates a path loss based on the signal strength. In step 835, the MS determines an UL Tx power value of which the gain difference value is compensated. The operation of determining the UL Tx power value includes compensating the path loss value in consideration of gain difference values between Tx and Rx beams in the BS and the MS, for example, as shown in Equations (4) to (6), and determining the Tx power value using the compensated path loss value. For example, the MS compensates the path loss value in consideration of a gain difference value $\Delta G_{array}^{BS}$ between the Tx/Rx beams of the BS received from the BS and a gain difference value $\Delta G_{array}^{MS}$ between the Tx/Rx beams according to a beam pattern difference between the Rx beam of the MS used to receive the reference signal of the BS and the Tx beam of the MS used to transmit data to an UL. Thereafter, the MS determines the Tx power value by using the compensated path loss value and controls UL Tx power according to the determined Tx power value. In step 837, the MS transmits an UL burst by using a Tx beam having the wide beamwidth of the MS Tx beam pattern indicated in step 831 (e.g., sub-frame #(N+1), UL sub-frame 927 in FIG. 9D). In this case, the Tx power is controlled according to the UL Tx power value determined in step 835 and the UL burst is transmitted. Thereafter, the BS receives the UL burst by using an Rx beam having a wide beamwidth.

As described above, the BS selects a BS Rx beam and a MS Tx beam suitable for UL transmission/reception based on the reference signal (for example, RACH or UL sounding signal) (e.g., 913 of FIG. 9A and 917 of FIG. 9B) transmitted to the UL by the MS according to a pair of BS Rx beam and MS Tx beam, and feedbacks relevant information to the MS (e.g., 915 of FIG. 9B and 925 of FIG. 9C).

Thereafter, the BS transmits pilot signals mapped to basic unit beams each having a relatively narrow beamwidth in different directions through a reference signal, such as midamble, with respect to a DL to the MS (e.g., 923 of FIG. 9C). Therefore, the MS may measure a channel quality of a specific beam or a beam generated by superposition of beams based on pilot signals mapped to basic unit beams each having a relatively narrow beamwidth in different directions transmitted from the BS in different directions. Based on measurement results, the MS may measure and update an instantaneous or temporal mean value/variance/standard deviation with respect to a channel quality matrix, such as CINR or RSSI for a DL, and perform prediction. Based on the channel quality information, the MS estimates a path loss value for a pair of MS Tx beam and MS Rx beam corresponding to the same direction among pairs of BS Rx beam and MS Tx beam transmitted from the BS for feedback.

Thereafter, the BS may report change and application of a beam pattern used in the same UL Tx/Rx direction at the time of burst allocation for UL data transmission to the MS. The MS compensates the estimated path loss value in consideration of a beam gain difference according to change in the beam pattern, determines a Tx power value according to the compensated path loss value, and performs UL power control according to the determined Tx power value. That is, it is possible to derive appropriate power values for respective subcarriers in UL signal transmission to perform UL power control. Furthermore, the MS may perform UL power control by additionally compensating for a beam gain value according to a difference in the MS's Tx/Rx beam patterns in a case where an Rx beam pattern of the MS used for path loss measurement is different from a Tx beam pattern used for UL data transmission.

On the other hand, although the BS is described as selecting a BS Rx beam and a MS Tx beam suitable for UL transmission/reception based on a reference signal transmitted by the MS through a UL and transmitting feedback regarding the selected information to the MS, other implementations are possible. As another implementation, the MS may report information about available different Tx beam patterns in the same direction for UL transmission to the BS, and the BS may instruct the MS to use a specific Tx beam pattern at the time of burst allocation for UL data transmission in consideration of the information.

As described above, embodiments of the present disclosure provide a method and apparatus for controlling UL Tx power control in consideration of beam gain differences according to use of different Tx/Rx beam patterns in a beamforming-based wireless communication system which performs transmission and reception with respect to uplink and downlink using one or more beam patterns having different beamwidths and beam gains. It is possible to improve transmission/reception performance and performing beamforming efficiently by controlling Tx power in consideration of a beam gain difference.

While the disclosure has been shown and described with reference to certain exemplary embodiments thereof, it will be understood by those skilled in the art that various changes in form and details may be made therein without departing from the spirit and scope of the disclosure as defined by the appended claims. For example, although the embodiments of the present disclosure are described with respect to UL Tx power control in consideration of beam gain differences according to use of different Tx/Rx beam patterns in a beamforming-based wireless communication system which performs transmission and reception with respect to uplink and downlink using one or more beam patterns having different beamwidths and beam gains, the present disclosure may applicable to DL Tx power control in consideration of beam gain differences according to use of different Tx/Rx beam patterns. In addition, although the embodiments of the present disclosure are described as selecting a beam having a relatively narrow beamwidth in a case of transmitting and receiving a reference signal and selecting a beam having a relatively wide beamwidth in a case of transmitting a synchronization channel/broadcast channel, the present disclosure is not limited thereto and may be applicable to a case of using different Tx/Rx beam patterns (beam gains and beamwidths). In addition, operations according to the embodiments of the present disclosure may be recorded on a computer-readable recording medium including a program command for performing operations implemented by various types of computers. The computer-readable recording medium may include a program command, a data file, a data structure, and a combination thereof. The program command may be specially designed and configured for the present disclosure or known to those skilled in the art. Examples of the computer-readable recording medium may include hardware apparatuses specially configured to store and execute a program command, such as a magnetic medium such as a hard disk, a floppy disk and a magnetic tape, an optical recording medium such as a CD-ROM and a DVD, a magneto-optical medium such as a floptical disk, a ROM, a RAM and a flash memory. Examples of the program command include machine language code made by a compiler or high-level language code executed by a computer using an interpreter or the like. When all or some of BSs and relays described in the present disclosure are implemented by computer programs, the computer-readable recoding medium storing the computer programs is also included in the present disclosure. While the disclosure has been shown and described with reference to certain preferred embodiments thereof, it will be understood by those skilled in the art that various changes in form and details may be made therein without departing from the spirit and scope of the disclosure as defined by the appended claims. Therefore, the scope of the disclosure is defined not by the detailed description of the disclosure but by the appended claims, and all differences within the scope will be construed as being included in the present disclosure.

What is claimed is:

1. A method of a mobile station (MS) in a wireless communication system, the method comprising:
   determining, based on a difference value between a gain of a transmit (Tx) beam of a base station (BS) and a gain of a receive (Rx) beam of the BS, an uplink (UL) Tx power value, wherein the difference value is used for compensating a path loss between the BS and the MS; and
   transmitting, to the BS, an UL signal using based on the determined UL Tx power value.

2. The method of claim 1, wherein determining the UL Tx power value comprises:
   determining, based on the gain difference value and an other difference value between a gain of a Tx beam of the MS and a gain of a Rx beam of the MS, the UL Tx power value,
   wherein the other difference value is used for compensating the path loss.

3. The method of claim 1, wherein determining the Tx power value comprises:
   receiving, from the BS, information regarding the difference value.

4. The method of claim 1, wherein determining the UL Tx power value comprises:
   receiving, from the BS, information regarding the gain of the Tx beam of the BS and information regarding the gain of the Rx beam of the BS; and
   determining the difference value based on the gain of the Tx beam of the BS and the gain of the Rx beam of the BS.

5. The method of claim 1, further comprising:
   transmitting, to the BS, information regarding an other gain difference value between a gain of a Tx beam of the MS and a gain of a Rx beam of the MS or information regarding the gain of the Tx beam of the MS and the gain of the Rx beam of the MS.

6. The method of claim 1, wherein the path loss is determined based on a received signal strength of a reference signal received from the BS and an equivalent isotropic radiated power (EIRP) value received from the BS.

7. An apparatus of a mobile station (MS) in a wireless environment, the apparatus comprising:
   at least one transceiver; and
   at least one processor, operatively coupled to the at least one transceiver, configured to:
      determine, based on a difference value between a gain of a transmit (Tx) beam of a base station (BS) and a gain of a receive (Rx) beam of the BS, an uplink (UL) Tx power value, wherein the difference value is used for compensating a path loss between the BS and the MS; and
      control to transmit, to the BS, an UL signal based on the determined UL Tx power value.

8. The apparatus of claim 7, wherein the at least one processor is configured to:
   determine based on the difference value and based on an other difference value between a gain of a Tx beam of the MS and a gain of a Rx beam of the MS, the UL Tx power value, and
   wherein the other difference value is used for compensating the path loss.

9. The apparatus of claim 7, wherein the at least one processor is further configured to
   control to receive information regarding the difference value from the BS.

10. The apparatus of claim 7, wherein the at least one processor is configured to:
    control to receive, from the BS, information regarding the gain of the Tx beam of the BS and information regarding the gain of the Rx beam of the BS; and
    determine the difference value based on the gain of the Tx beam of the BS and the gain of the Rx beam of the BS.

11. The apparatus of claim 7, wherein the at least one processor is further configured to control to:
    transmit, to the BS, information regarding an other difference value between a gain of a Tx beam of the MS and a gain of a Rx beam of the MS or information regarding the gain of the Tx beam of the MS and the gain of the Rx beam of the MS.

12. The apparatus of claim 7, wherein the path loss is determined based on a received signal strength of a reference signal received from the BS and an equivalent isotropic radiated power (EIRP) value received from the BS.

13. A method of a base station (BS) in a wireless environment, the method comprising:
    receiving, from a mobile station (MS), an uplink (UL) signal transmitted based on an UL transmit (Tx) power value,
    wherein the UL Tx power value is determined based on a difference value between a gain of a Tx beam of the BS and a gain of a receive (Rx) beam of the BS, and
    wherein the difference value is used for compensating a path loss between the BS and the MS.

14. The method of claim 13, wherein the UL Tx power value is determined based on the difference value and an other difference value
    between a gain of a Tx beam of the MS and a gain of a Rx beam of the MS, and
    wherein the other difference value is used for compensating the path loss.

15. The method of claim 13, further comprising:
    transmitting, to the MS, information regarding the difference value.

16. The method of claim 13, further comprising:
    transmitting, to the MS, information regarding the gain of the Tx beam of the BS and information regarding the gain of the Rx beam of the BS.

17. The method of claim 13, further comprising:
    receiving, from the MS, information regarding an other difference value between a gain of a Tx beam of the MS and a gain of a Rx beam of the MS or information regarding the gain of the Tx beam of the MS and the gain of the Rx beam of the MS.

18. The method of claim 13, wherein the path loss is determined based on a received signal strength of a reference signal transmitted from the BS and an equivalent isotropic radiated power (EIRP) value transmitted from the BS.

19. An apparatus of a base station (BS) in a wireless environment, the apparatus comprising:
    at least one transceiver; and
    at least one processor, operatively coupled to the at least one transceiver, configured to:
    control to receive, from a mobile station (MS), an uplink (UL) signal transmitted based on an UL transmit (Tx) power value,
    wherein the UL Tx power value is determined based on a difference value between a gain of a Tx beam of the BS and a gain of a receive (Rx) beam of the BS, and
    wherein the difference value is used for compensating a path loss between the BS and the MS.

20. The apparatus of claim 19, wherein the UL Tx power value is determined based on the difference value and an other difference value between a gain of a Tx beam of the MS and a gain of a Rx beam of the MS, and
    wherein the other difference value is used for compensating the path loss.

21. The apparatus of claim 19, wherein the least one processor is further configured to:
    control to transmit, to the MS, information regarding the difference value.

22. The apparatus of claim 19, wherein the at least one processor is further configured to:
    control to transmit, to the MS, information regarding the gain of the Tx beam of the BS and information regarding the gain of the Rx beam of the BS.

23. The apparatus of claim 20, wherein the at least one processor is further configured to:
    control to receive, from the MS, information regarding another difference value between a gain of a Tx beam of the MS and a gain of a Rx beam of the MS or information regarding the gain of the Tx beam of the MS and the gain of the Rx beam of the MS.

24. The apparatus of claim 19, wherein:
    the path loss is determined based on a received signal strength of a reference signal transmitted from the BS and an equivalent isotropic radiated power (EIRP) value transmitted from the BS.

25. A method of a mobile station (MS) in a wireless environment, the method comprising:
    determining, based on a difference value between a gain of a transmit (Tx) beam of the MS and a gain of a receive (Rx) beam of the MS, an uplink (UL) Tx power value, wherein the difference value is used for compensating a path loss between a base station (BS) and the MS; and
    transmitting, to the BS, an UL signal based on the determined UL Tx power value.

26. The method of claim 25, wherein determining the UL Tx power value further comprises:
    determining, based on the difference value and an other difference value between a gain of a Tx beam of the BS and a gain of a Rx beam of the BS, the UL Tx power value,
    wherein the other difference value is used for compensating the path loss.

27. The method of claim 26, wherein determining the UL Tx power value comprises:
    receiving, from the BS, information regarding the another difference value.

28. The method of claim 26, wherein determining the UL Tx power value comprises:
    receiving, from the BS, information regarding the gain of the Tx beam of the BS and information regarding the gain of the Rx beam of the BS; and determining the another difference value based on the gain of the Tx beam of the BS and the gain of the Rx beam of the BS.

29. The method of claim 25, further comprising, transmitting, to the BS, information regarding the difference value or information regarding the gain of the Tx beam of the MS and the gain of the Rx beam of the MS.

30. The method of claim 25, wherein the path loss is determined based on a received signal strength of a reference signal received from the BS and an equivalent isotropic radiated power (EIRP) value received from the BS.

31. An apparatus of a mobile station (MS) in a wireless environment, the apparatus comprising:
at least one transceiver; and
at least one processor, operatively coupled to the at least one transceiver, configured to:
determine, based on a difference value between a gain of a transmit (Tx) beam of the MS and a gain of a receive (Rx) beam of the MS, an uplink (UL) Tx power value, wherein the difference value is used for compensating a path loss between a base station (BS) and the MS; and
control to transmit, the BS, an UL signal based on the determined UL Tx power value.

32. The apparatus of claim 31, wherein the at least one processor is further configured to determine, based on the gain difference value and based on an other difference value between a gain of a Tx beam of the BS and a gain of a Rx beam of the BS, the UL Tx power value, and
wherein the other difference value is used for compensating the path loss.

33. The apparatus of claim 32, wherein the at least one processor is further configured to control to receive information regarding the other gain difference value from the BS.

34. The apparatus of claim 32, wherein the at least one processor is configured to:
control to receive, from the BS, information regarding the gain of the Tx beam of the BS and information regarding the gain of the Rx beam of the BS; and
determine the other difference value based on the gain of the Tx beam of the BS and the gain of the Rx beam of the BS.

35. The apparatus of claim 31, wherein the at least one processor is further configured to:
control to transmit, to the BS, information regarding the difference value or information regarding the gain of the Tx beam of the MS and the gain of the Rx beam of the MS.

36. The apparatus of claim 31, wherein the path loss is determined based on a received signal strength of a reference signal received from the BS and an equivalent isotropic radiated power (EIRP) value received from the BS.

37. A method of a base station (BS) in a wireless environment, the method comprising:
receiving, from a mobile station (MS), an uplink (UL) signal transmitted based on an UL transmit (Tx) power value,
wherein the UL Tx power value is determined based on a difference value between a gain of a Tx beam of the MS and a gain of a receive (Rx) beam of the MS, and
wherein the difference value is used for compensating a path loss between the BS and the MS.

38. The method of claim 37, wherein the UL Tx power value is determined based on the difference value and an other difference value
between a gain of a Tx beam of the BS and a gain of a Rx beam of the BS, and
wherein the other difference value is used for compensating the path loss.

39. The method of claim 37, further comprising:
receiving, from the MS, information regarding the difference value or information regarding the gain of the Tx beam of the MS and the gain of the Rx beam of the MS.

40. The method of claim 38, further comprising:
transmitting, to the MS, information regarding the other difference value.

41. The method of claim 38, further comprising:
transmitting, to the MS, information regarding the gain of the Tx beam of the BS and information regarding the gain of the Rx beam of the BS.

42. The method of claim 37, wherein the path loss is determined based on a received signal strength of a reference signal transmitted from the BS and an equivalent isotropic radiated power (EIRP) value transmitted from the BS.

43. An apparatus of a base station (BS) in a wireless environment, the apparatus comprising:
at least one transceiver; and
at least one processor, operatively coupled to the at least one transceiver, configured to:
control to receive, from a mobile station (MS), an uplink (UL) signal transmitted based on an UL transmit (Tx) power value,
wherein the UL Tx power value is determined based on a difference value between a gain of a Tx beam of the MS and a gain of a receive (Rx) beam of the MS, and
wherein the difference value is used for compensating a path loss between the BS and the MS.

44. The apparatus of claim 43, wherein the UL Tx power value is determined based on the difference value and an other difference value between a gain of a Tx beam of the BS and a gain of a Rx beam of the BS, and
wherein the other difference value is used for compensating the path loss.

45. The apparatus of claim 44, wherein the at least one processor is further configured to:
control to transmit, to the MS, information regarding an other difference value.

46. The apparatus of claim 45, wherein the at least one processor is further configured to:
control to transmit, to the MS, information regarding the gain of the Tx beam of the BS and information regarding the gain of the Rx beam of the BS.

47. The apparatus of claim 45, wherein the at least one processor is further configured to:
control to receive, from the MS, information regarding the difference value or information regarding the gain of the Tx beam of the MS and the gain of the Rx beam of the MS.

48. The apparatus of claim 43, wherein the path loss is determined based on a received signal strength of a reference signal transmitted from the BS and an equivalent isotropic radiated power (EIRP) value transmitted from the BS.

* * * * *